(12) United States Patent
Tamura

(10) Patent No.: US 8,176,171 B2
(45) Date of Patent: May 8, 2012

(54) INFORMATION PROCESSING DEVICE AND INFORMATION PROCESSING METHOD

(75) Inventor: Makiya Tamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 545 days.

(21) Appl. No.: 12/329,249

(22) Filed: Dec. 5, 2008

(65) Prior Publication Data

US 2009/0150544 A1    Jun. 11, 2009

(30) Foreign Application Priority Data

Dec. 11, 2007    (JP) .................... 2007-320142

(51) Int. Cl.
*G06F 15/173*    (2006.01)
(52) U.S. Cl. ........................................ 709/224
(58) Field of Classification Search .......... 718/101–105; 709/224–226, 230–236; 370/428
See application file for complete search history.

(56) References Cited

U.S. PATENT DOCUMENTS

| 7,464,410 | B1 * | 12/2008 | Halasz et al. ............... 726/23 |
| 2002/0078214 | A1 | 6/2002 | Shindou et al. |
| 2007/0101199 | A1 * | 5/2007 | Kosuge et al. ............ 714/42 |
| 2009/0119564 | A1 * | 5/2009 | Sagfors et al. ........... 714/748 |

FOREIGN PATENT DOCUMENTS

JP        2002-189650        7/2002

\* cited by examiner

*Primary Examiner* — Chirag R Patel
(74) *Attorney, Agent, or Firm* — Fitzpatrick, Cella, Harper & Scinto

(57) ABSTRACT

An information processing device and an information processing method are provided which can provide services to all clients (users) at a certain service level while preventing a server from being overloaded by reducing concentration of access from some clients without requiring special processing on the client side. The server monitors requests sent from clients and does not execute business logic as an error when receiving intervals of requests do not exceed a threshold. Also, timing of a request being resent from a client next time is controlled by controlling return timing when an error response is returned to the client.

11 Claims, 17 Drawing Sheets

INFORMATION PROCESSING DEVICE AND INFORMATION PROCESSING METHOD

BACKGROUND OF THE INVENTION

1. Field of the Invention

The present invention relates to an information processing device and an information processing method. In particular, the present invention relates to an information processing device and an information processing method to improve a concentration of access to a server in a method in which server resources are used by clients like in a client/server system.

2. Description of the Related Art

With widespread use of the Internet in recent years, various kinds of ASP (Application Service Provider) services are provided on the Internet. An ASP service provides applications to customers via the Internet. ASP service providers provide services in a form in which a system providing ASP services is shared by end users. Accordingly, ASP services have advantages that end users can use services at relatively low cost and there is no need of server management work on the end user side.

Since ASP services are provided on the Internet, various users use ASP services. For example, employees of some enterprise use an ASP service to perform business operations and consumers use an ASP service for individuals' hobbies. Such various kinds of users use of ASP services signifies that "time and purpose of users using ASP services vary from user to user."

As used herein, the phrase "time and purpose of users using ASP services vary from user to user" means that, if an ASP service stops, business operations of users may stop, causing problems to many users.

It often happens that, when many people in one enterprise A want to access and use an ASP service at the same time, a person in another enterprise B may want to use the service for an important business operation. Such a case may cause a situation in which access for Enterprise B cannot be processed due to the increased processing load caused by user access from Enterprise A. Accordingly, the user of Enterprise B would run into trouble.

Thus, "not stopping the service" as well as "providing services without concentrating on specific users" are emphasized in ASP services to prevent the above situation from occurring.

However, phenomena such as a concentration or a rapid increase in access can occur at any time in ASP services. For example, access may be concentrated on a server at a specific time (for example, access is concentrated in the early-morning on Monday). Also, access may increases rapidly beyond expectations for some reason (for example, access to weather news and traffic information sites increases rapidly when abnormal weather conditions occur such as a typhoon). With such a concentration or a rapid increase in access, the server may stop in a worst-case scenario due to an increased load on the server.

With the advance of technology, such as Web services, in recent years, the interfaces (API) of services on the Internet are publicly opened to any client application. Publicly opening the interface means that any client application can access servers providing services on the Internet in various forms. That is, once the interface of a service is publicly opened on the Internet, any one can develop a client application to access the server without concern by the ASP operator. Such a case is envisaged where accesses from the developed client application is performed continuously without a time interval due to user's thinking in such as Web browser access. Thus, it is considered that a rapid increase in access beyond expectations can be expected for such server, which is not caused by intentional attacks.

In order to cope with such situations, each ASP service provider takes measures against loads caused by a rapid increase in access to a server. Here, a rapid increase in access means that requests sent from clients to the server increase rapidly. If requests to the server increase (concentrate), a state of heavy processing load occurs in the server. Measures against loads caused by a rapid increase in access to a server are frequently taken by ASP services from the viewpoint of "How to narrow down requests to be processed". Measures against loads caused by a rapid increase in access generally taken by ASP services are shown below:

Measure 1: Narrow down the number of accessible users by user authentication or the like.

Measure 2: Increase the number of servers as shown in FIG. 13 to distribute requests to be processed by each server.

Measure 3: Restrict the number of sessions for each server to narrow down the number of sessions to be processed at a time.

Many ASP services take all three measures. That is, Measure 1 narrows down the number of accessible users to restrict the absolute quantity of requests that can be sent to the server. Next, Measure 2 assures processing capacities of servers to a certain level. Furthermore, Measure 3 further narrows down the number of requests as a countermeasure when as many requests as to require processing capacities exceeding server resources prepared by measure 2 are sent from clients.

FIG. 14 and FIG. 15 are diagrams to illustrate measure 3.

A case in which a plurality of servers is provided and requests sent from clients are distributed to each server for load sharing, as shown in FIG. 14, is considered. FIG. 14 shows a state after requests further increase from a load state of in FIG. 13. In such a case, though loads are shared, the number of requests to be processed by each server increases in the end and a processing load of each server increases.

FIG. 15 shows internal processing of individual servers. In FIG. 15, a request receiving unit 1300 receives requests from clients, but the request receiving unit 1300 returns errors to clients of requests exceeding the preset number of sessions. That is, requests exceeding the number of sessions are not sent to a service providing unit 1301 and no internal processing (processing by the service providing unit) is performed for such requests. Thus, the overall processing load of the server can be reduced by restricting the number of sessions.

Servers providing ASP services take measures, as describe above, to respond to loads generated by a rapid increase in access.

Japanese Patent Laid-Open No. 2002-189650 proposes a processing technology to improve concentration of access on a server in a client/server system. According to the invention described in Japanese Patent Laid-Open No. 2002-189650, when a server receives a service start request from a client, the server issues a numbered ticket and returns the ticket to the client. The numbered ticket specifies the transmission period when the request should be sent next time and the client resends the request in the period specified by the numbered ticket.

According to Japanese Patent Laid-Open No. 2002-189650, the server specifies the time when the server is accessible from the client and the client sends requests at the specified time. That is, concentration of requests on the server is avoided by controlling the number of requests to be processed by the server in a certain period of time.

However, according to the conventional technology in which the above Measures 1 to 3 are taken, requests from the client that started a session are supposed to be processed by the server (the service providing unit). However, if the one client that started the session continuously sends requests intensively during the same session, a problem arises that requests are concentrated on each server and processing loads of the servers increase rapidly.

Referring to FIGS. 16 and 17, a situation will be described in which requests are concentrated on each server and processing loads of the servers increase rapidly when the conventional technology, in which the above Measures 1 to 3, are taken. It is assumed that a request sent from some client A is received by the server in a system in which the above Measures 1 to 3 are taken. Once a request is received by the server, a session is started and requests sent from the client A are received until the session ends. Therefore, if requests are continuously and intensively sent from a plurality of clients once sessions are started, as shown in FIG. 16, each server will process all requests, as shown in FIG. 17.

In such a case, due to the restriction of the number of sessions by Measure 3, the server may not be able to respond to requests from other client applications attempting to start a new session. That is, though services are widely provided to users on the Internet, services cannot be provided to all users at a certain service level. For example, some users may not be able to use services at all.

To avoid concentration of requests on the server by using the technology disclosed by Japanese Patent Laid-Open No. 2002-189650, a special function to understand distributed numbered tickets is needed. However, client applications using general-purpose Web browsers and Web services do not necessarily implement a function to understand numbered tickets.

Therefore, a system providing an ASP service is demanded to take measures for tasks shown below:

(Task 1) Cope with situations in which services cannot be provided to all clients (users) at a certain service level due to concentration of requests from a client who once started a session.

(Task 2) Cope with situations in which special processing (for example, a function like that of Japanese Patent Laid-Open No. 2002-189650) is not implemented on the client side using general-purpose Web browser and Web service.

SUMMARY OF THE INVENTION

An object of the present invention is to provide an information processing device and an information processing method capable of reducing an overload of a server without requiring special processing on the client side.

An information processing device of the present invention includes a request receiving unit configured to receive a request; a request monitoring unit configured to store information related to the request received by the request receiving unit in a request recording database, the information being used for determining whether or not to reject the received request; a request monitoring setting value management database managing a reference value for determining to reject a received request; a request processing determination unit configured to determine whether or not to reject the request received by the request receiving unit with reference to the request monitoring setting value management database and the request recording database; and an error response transmission unit configured to return an error response, when the request processing determination unit determines to reject the received request, to a client that transmitted the request after a predetermined time has passed from the determination of rejection.

An information processing method of the present invention includes a request receiving step of receiving a request; a request monitoring step of storing information related to the request received at the request receiving step in a request recording database, the information being used for determining whether or not to reject the received request; a request processing determination step of determining whether or not to reject the request received at the request receiving step with reference to a request monitoring setting value management database to manage a reference value for determining to reject a received request and the request recording database; and an error response transmission step of returning an error response, when the request processing determination step determined not to reject the received request, to a client that transmitted the request after a certain time has passed from the determination of rejection.

According to the present invention, concentration of access to a server can be improved by avoiding situations in which, for example, only users using some client application occupy server resources. At the same time, by controlling timing to return a response on the server side, the time interval before a client application sends the next request can be controlled. Accordingly, continuous access by the client application can be avoided without requiring special processing on the client side.

Further features of the present invention will become apparent from the following description of exemplary embodiments with reference to the attached drawings.

DESCRIPTION OF THE EMBODIMENTS

Preferred embodiments of the present invention will be described below with reference to drawings. However, components shown in drawings are only exemplifications and do not limit the scope of the present invention thereto.

First Embodiment

Figure 1:
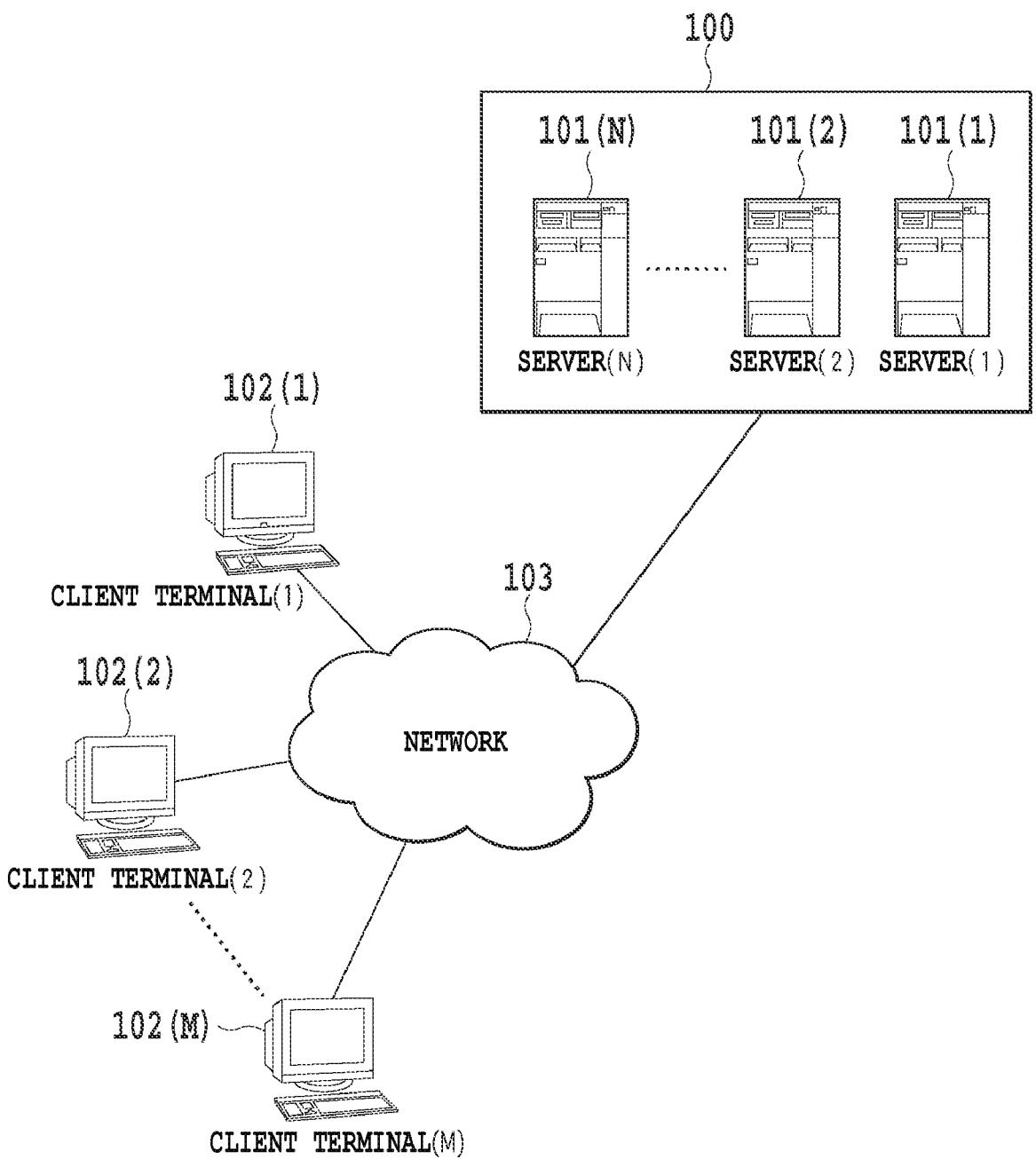
FIG. 1 is a diagram showing a specific system configuration example of a system providing services via a network such as the Internet according to an embodiment of the present invention.

FIG. 1 is a diagram showing a specific system configuration example of a system providing services via a network such as the Internet to which an embodiment of the present invention can be applied. As shown in FIG. 1, a system 100 providing services and a plurality of client terminals 102 (1), 102 (2), ..., 102 (M) such as PCs is connected via a network 103. The system 100 providing the services includes a plurality of servers 101 (1), 101(2), ..., 101(N). The network 103 is assumed to be a network such as the Internet and an intranet, but may be a different network system.

Here, when any one server among the plurality of servers 101 (1), 101(2), ..., 101(N) is indicated, the server is denoted as the server 101 (X) to simplify the description. Also, when any one client terminal among the plurality of client terminals 102 (1), 102 (2), ... 102(M) is indicated, the client terminal is denoted as the client terminal 102 (Y).

Figure 2:
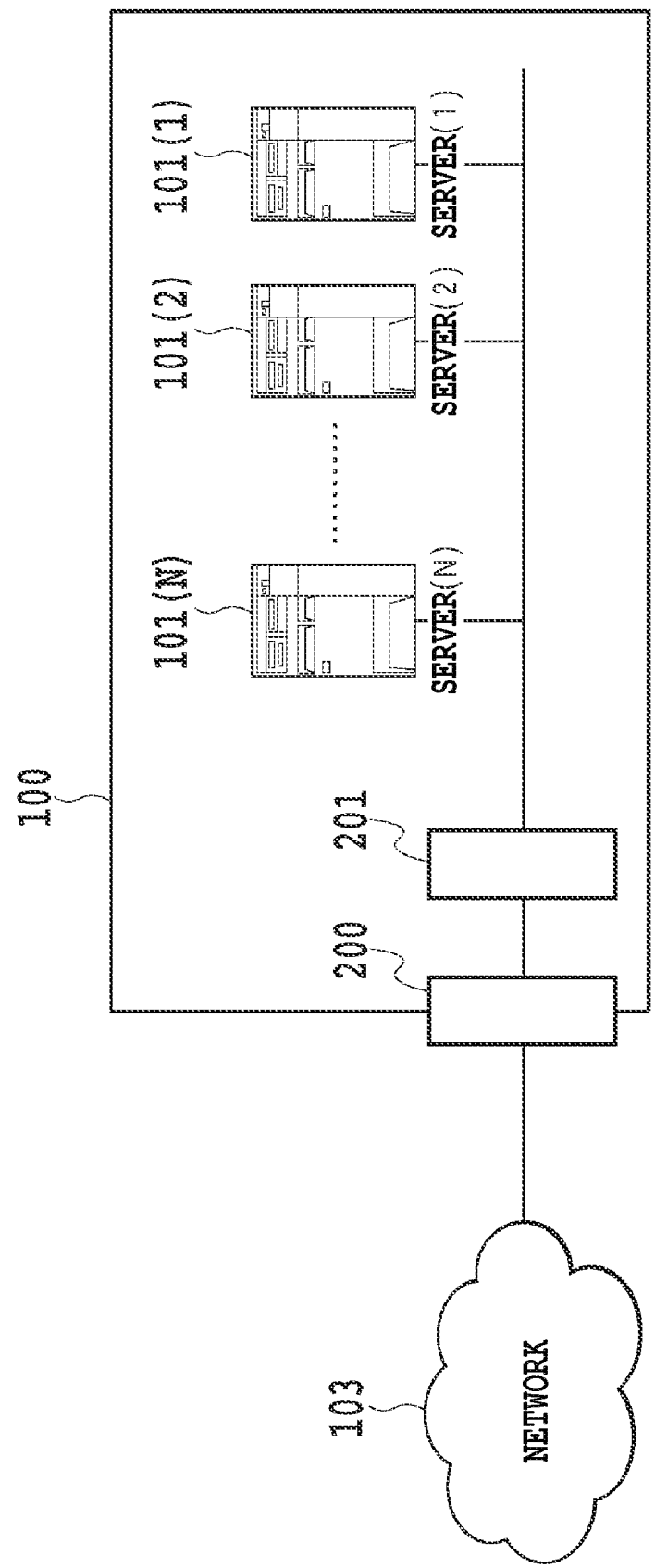
FIG. 2 is a diagram showing a specific system configuration example of servers of the system providing services via a network such as the Internet according to the embodiment of the present invention.

FIG. 2 is a diagram showing a specific system configuration example of servers of the system providing services via a network such as the Internet, according to the present embodiment. That is, FIG. 2 is a system configuration diagram of the system 100 providing the services in FIG. 1.

The servers 101 (1), 101(2), ..., 101 (N) are a group of servers performing processing to provide the services and any server 101 (X) is connected to any other server 101 (X') via a network such as a LAN.

Reference numeral 200 denotes a firewall which is set up at a connection port to the network 103 such as the Internet and is connected to a load balancer 201 described later via a network such as a LAN. The firewall 200 captures communication data exchanged between the network 103 and the load balancer 201 and controls to permit or prohibit passage of the communication data in accordance with policies of the system 100 providing the services. Accordingly, unauthorized access from the network 103 to the server 101 (X) is prevented to provide only necessary services to users and also security is ensured.

Reference numeral 201 denotes a load balancer which is connected to the firewall 200 and any server 101 (X) via network such as a LAN. A network including the firewall 200 and the load balancer 201 and a network including the load balancer 201 and the servers 101 (1), 101(2), ..., 101(N) are configured as logically separate networks.

The steps that occur after the client terminal 102 (Y) sends requests and before a response is received are as follows:

(Step 1) The client terminal 102 (Y) sends a request to the system 100 providing the services via the network 103.

(Step 2) After receiving the request from the client terminal 102 (Y), the firewall 200 determines whether or not to allow the request to pass, and in the case of allowing the pass, transfers the request to the load balancer 201.

(Step 3) After receiving the request from the firewall 200, the load balancer 201 identifies the server 101 (X) to which processing should be requested according to a load sharing algorithm and transfers the request to the server 101 (X).

(Step 4) After receiving the request from the load balancer 201, the server 101 (X) performs processing of the request and returns an execution result to the load balancer 201 as a response.

(Step 5) The load balancer 201 transfers the response received from the server 101 (X) to the firewall 200.

(Step 6) The firewall 200 transfers the response transferred from the load balancer 201 to the client terminal 102 (Y) via the network 103.

Figure 3:
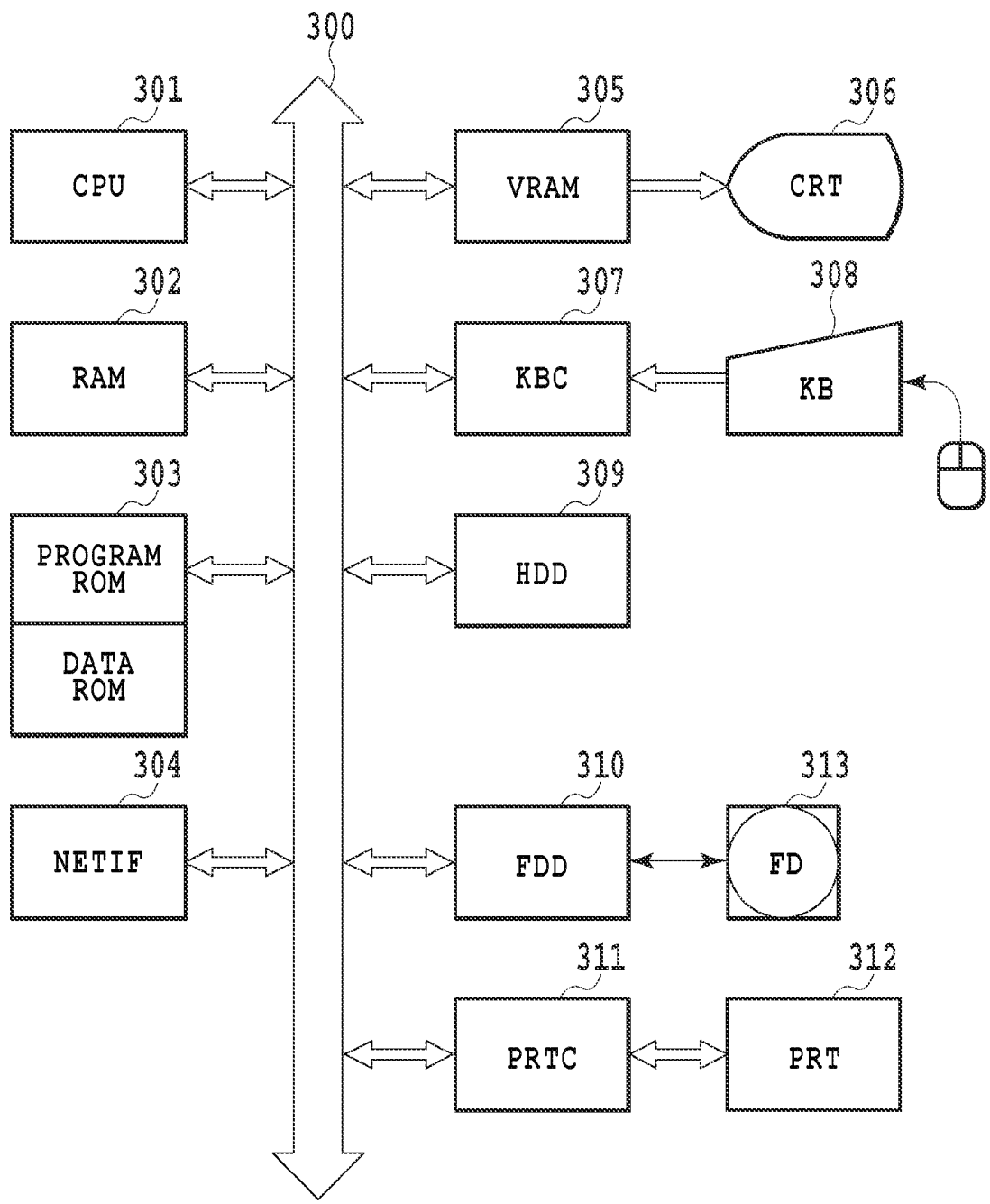
FIG. 3 is a diagram showing a specific configuration example of a server 101 (X) and a client terminal 102 (Y) according to the embodiment of the present invention.

FIG. 3 is a diagram showing a specific configuration example of the server 101 (X). Since a specific device configuration of the client terminal 102 (Y) can be provided by a configuration similar to that in FIG. 3, it is not described here.

In FIG. 3, reference numeral 301 denotes a central processing unit (hereinafter, referred to as the CPU) directing operations/control of information processing devices such as the server 101 (X).

Reference numeral 302 denotes a random access memory (hereinafter, referred to as the RAM) which functions as the main memory of the CPU 301 and as an execution area of an execution program and a data area.

Reference numeral 303 denotes a read-only memory (hereinafter, referred to as the ROM) for storing operation processing procedures (control programs) of the CPU 301 shown in FIGS. 8 and 11 described later and the like. The ROM 303 includes a program ROM in which system software (operating system (OS)), which is a system program to control devices in the information processing device, is recorded and a data ROM in which information necessary to operate the system is recorded. Instead of the ROM 303, some devices use an HDD 309 described later.

Reference numeral 304 denotes a network interface (hereinafter, referred to as a NETIF) and controls data transfer between information processing devices via a network and diagnosis of connection status.

Reference numeral 305 denotes a video RAM (hereinafter, referred to as a VRAM) and expands images to be displayed on a screen of a CRT 306 showing the operating state of an information processing device described later and controls the display thereof.

Reference numeral 306 denotes a display device (hereinafter, referred to as a CRT) such as a display.

Reference numeral 307 denotes a controller (hereinafter, referred to as a KBC) to control an input signal from an external input device 308.

Reference numeral 308 denotes an external input device (hereinafter, referred to as a KB) to accept an operation performed by a user and, for example, a pointing device such as a keyboard and mouse is used.

Reference numeral 309 denotes a hard disk drive (hereinafter, referred to as an HDD) and is used to store application programs and various kinds of data. Application programs in the present embodiment are software programs executing various processing unit in the present embodiment and the like.

Reference numeral 310 denotes an external input/output device (hereinafter, referred to as an FDD) and is used to read the above application programs from a medium or the like. For example, the FDD 310 is a floppy (registered trademark) disk drive, a CD-ROM drive or the like to receive and discharge a removable disk.

Reference numeral 313 denotes a removable data recording device (removable media) such as a magnetic recording medium, optical recording medium, magneto-optical recording medium, and semiconductor recording medium read by the FDD 310. The magnetic recording medium includes, for example, a floppy (registered trademark) disk (registered trademark) and external hard disk. The optical recording medium includes, for example, a CD-ROM, and the magneto-optical recording medium includes, for example, an MO. The semiconductor recording medium includes, for example, a memory card. Incidentally, application programs and data stored in the HDD 309 can also be stored in the FD 313 for use.

Reference numeral 311 denotes a controller (hereinafter, referred to as a PRTC) to control an output signal to a PRT 312 described later.

Reference numeral 312 denotes a printer (hereinafter, referred to as a PRT), for example, a laser printer.

Reference numeral 300 denotes a transmission bus (an address bus, data bus, input/output bus, and control bus) to connect each unit described above.

Figure 4:
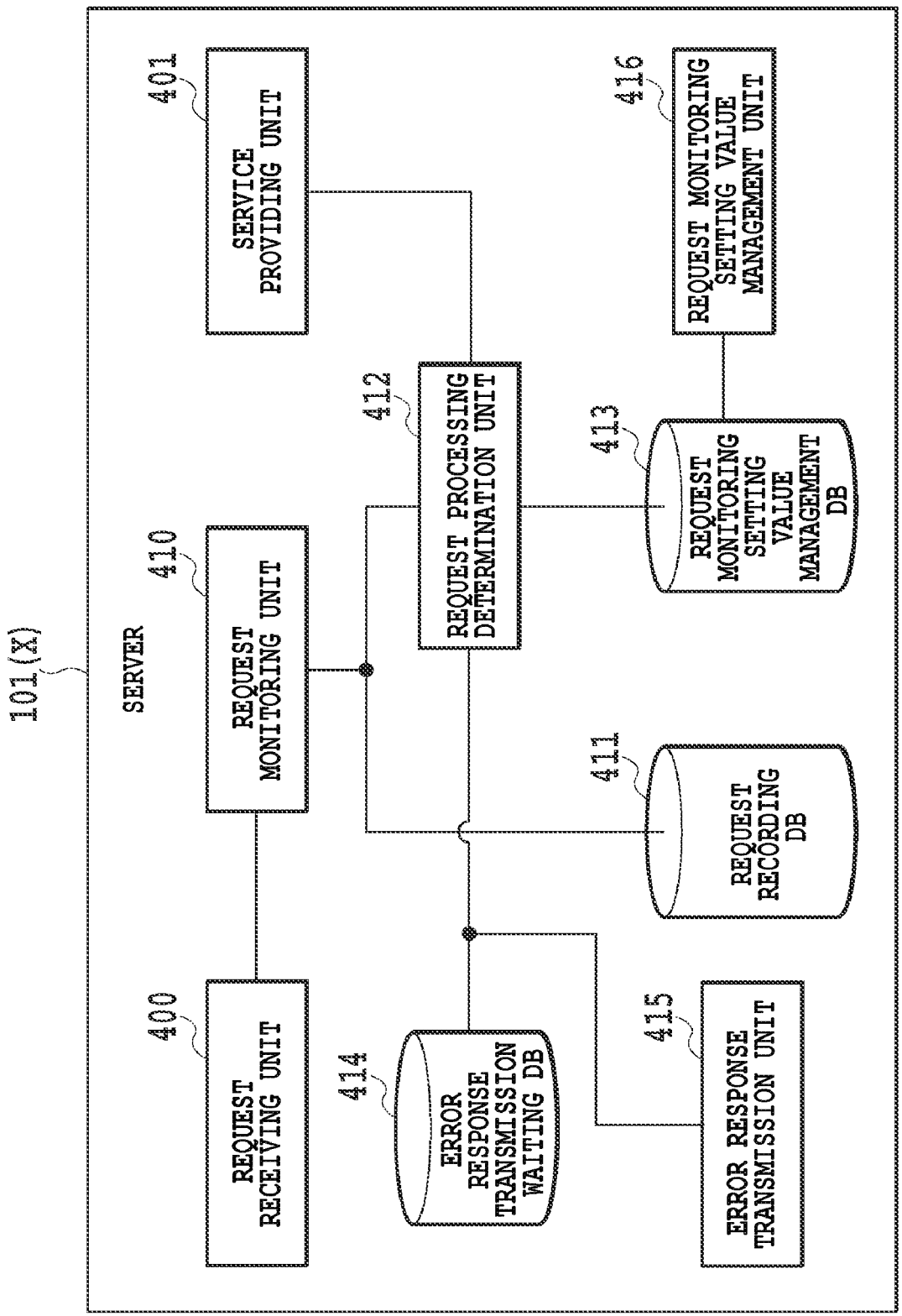
FIG. 4 is a functional block diagram of the server according to the embodiment of the present invention.

FIG. 4 is a diagram (functional block diagram) illustrating a group of functions of the server 101 (X) according to the present embodiment and storage unit for storing information.

Reference numeral 400 denotes a request receiving unit which receives a request sent from the client terminal 102 (Y) before delivering the received request to a request monitoring unit 410 described later.

Reference numeral 401 denotes a service providing unit which performs processing on the request received by the request receiving unit 400 before returning a processing result to the client terminal 102 (Y) as a response. That is, the service providing unit 401 performs processing to provide services to end users.

Reference numeral 410 denotes a request monitoring unit which stores receiving time information of a request received by the request receiving unit 400 and connection information (request ID or session ID) to the client terminal 102 (Y) in a request recording database 411 described later. Further, the request monitoring unit delivers the request to a request processing determination unit 412.

Reference numeral 411 denotes a request recording database which stores receiving time information of a request received by the request monitoring unit 410 and connection information (request ID and session ID) by associating them with each other. Hereinafter, the request recording database 411 is described as the request recording DB 411.

Reference numeral 412 denotes a request processing determination unit which determines whether or not to execute the demanded service for the received request (determine whether or not to reject the request). When determining to execute the service, the request processing determination unit 412 delivers the request to the service providing unit 401. When determining not to execute the service, the request processing determination unit 412 delivers the request to an error response transmission unit 415 described later. In addition, the request processing determination unit 412 delivers a response estimated time, which is an estimated time to return a response, to an error response transmission waiting database 414.

Reference numeral 413 denotes a request monitoring setting value management database which manages the determination reference value used when determining whether or not to execute the demanded service for the received request and to return a response. Hereinafter, the request monitoring setting value management database 413 is described as the request monitoring setting value management DB 413.

The request recording DB 411 has, as described above, information about requests received by the request monitoring unit such as request receiving time information stored therein. The request monitoring setting value management DB 413 has the reference value used for determining to reject a received request such as the determination reference value stored therein. Thus, the request processing determination unit 412 can refer to the request recording DB 411 and the request monitoring setting value management DB 413 to determine whether or not to reject a request received from the request monitoring unit 410.

Reference numeral 414 denotes an error response transmission waiting database which manages the return time of an error response (response estimated time) to a request for which the request processing determination unit 412 determines not to execute a service. That is, the error response transmission waiting database 414 manages information about an error response such as the error response return time and the request ID and session ID of a request for which service execution is rejected. Hereinafter, the error response transmission waiting database 414 is descried as the error response transmission waiting DB 414.

Reference numeral 415 denotes an error response return unit which returns an error response to the client terminal 102 (Y) at a specified time (when a fixed time has elapsed after an error determination) by referring to the error response return waiting DB 414.

Reference numeral 416 denotes a request monitoring setting value management unit which performs predetermined processing of a setting value to the request monitoring setting value management DB 413 in accordance with a request from the client terminal 102 (Y) for administrator. The predetermined processing can be defined as one of setting, update, and deletion of a setting value and to be set based on the request from the client terminal 102 (Y) for the administrator.

Figure 5:
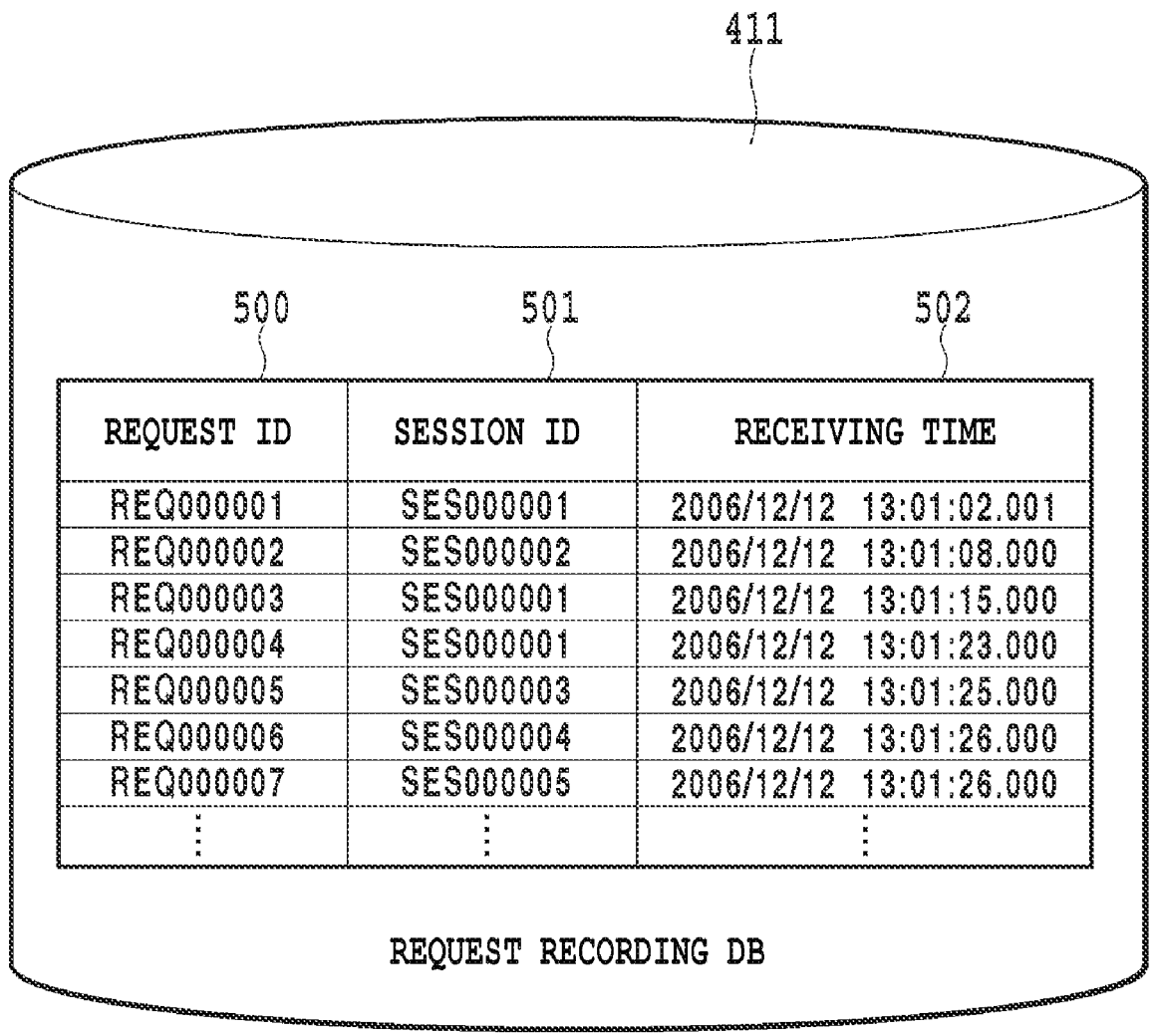
FIG. 5 is a diagram showing a specific data structure example of a request recording DB 411 on the server 101 (X) according to the embodiment of the present invention.

FIG. 5 is a diagram showing a specific data structure example of the request recording DB 411 on the server 101 (X).

Reference numeral 500 denotes a request ID which is an identifier to identify each request received from the client terminal 102 (Y).

Reference numeral 501 denotes a session ID which is an identifier to identify a plurality of pairs of request and response as a series of sequence.

Reference numeral 502 denotes a receiving time indicating a time at which the server 101 (X) received a request.

Figure 6:
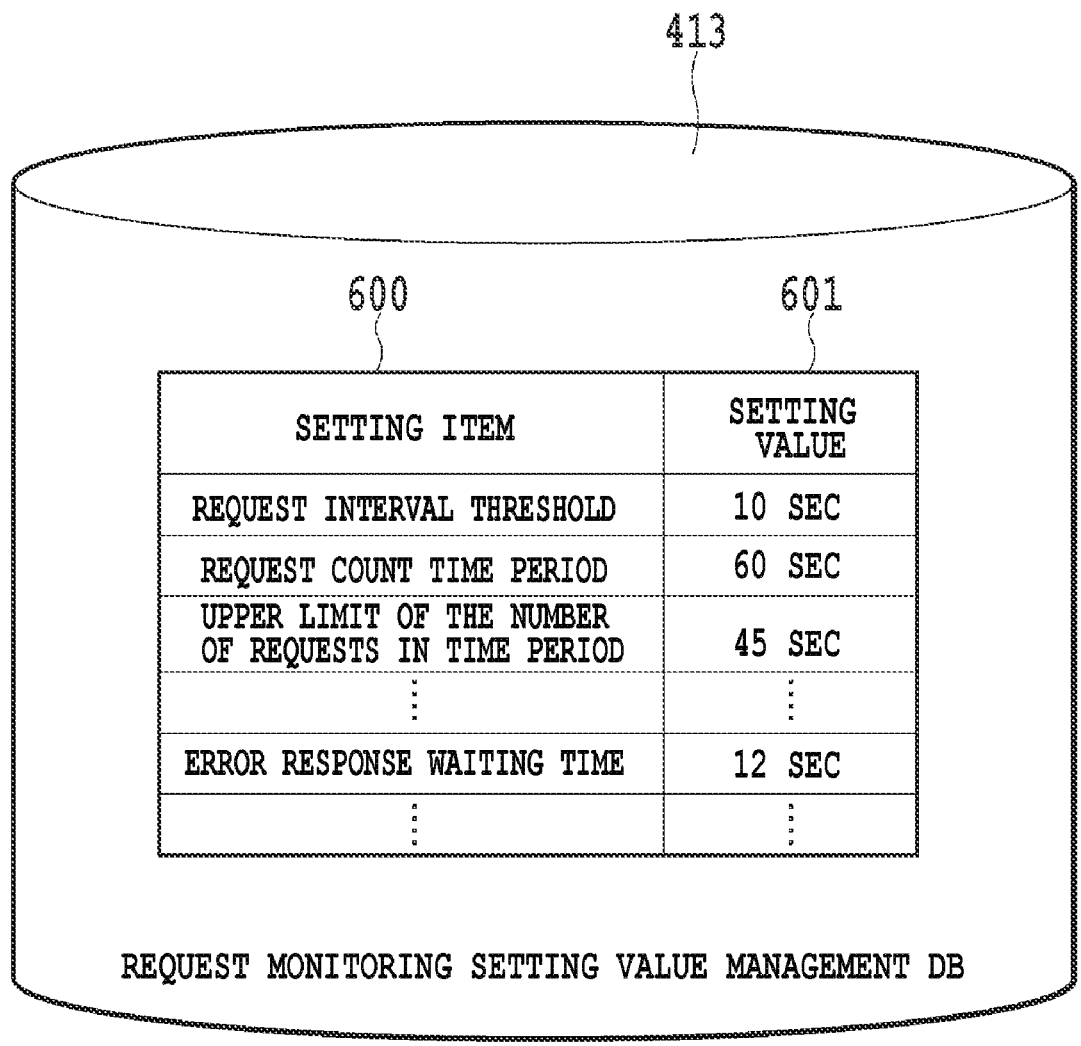
FIG. 6 is a diagram showing a specific data structure example of a request monitoring setting value management DB 413 on the server 101 (X) according to the embodiment of the present invention.

FIG. 6 is a diagram showing a specific data structure example of the request monitoring setting value management DB 413 on the server 101 (X).

Reference numeral 600 denotes a setting item which is referred to by the request processing determination unit 412. In the present embodiment, a request interval threshold is adopted as a criterion by the request processing determination unit 412, but the number of requests sent within a certain period or the like may be selected as a criterion. The request interval threshold to be the criterion, request count period for determining the number of requests sent in the period, upper limit of the number of requests in the period and the like are set to the setting item 600. Also, the response transmission waiting time to decide the error response return time when no service is provided is set to the setting item 600.

Figure 7:
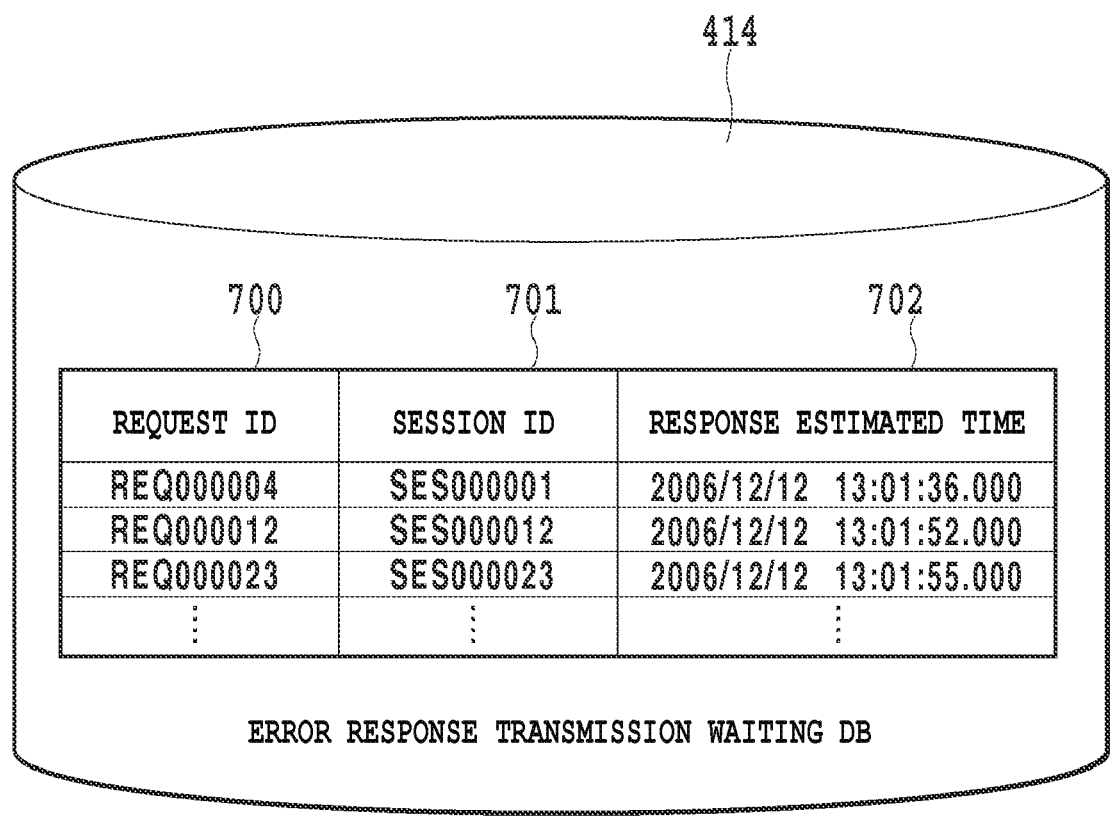
FIG. 7 is a diagram showing a specific data structure example of an error response transmission waiting DB 414 on the server 101 (X) according to the embodiment of the present invention.

Reference numeral 601 denotes a setting value for a setting item. FIG. 7 is a diagram showing a specific data structure example of the error response transmission waiting DB 414 on the server 101 (X).

Reference numeral 700 denotes a request ID which is associated with the request ID 500 in the request recording DB 411.

Reference numeral 701 denotes a session ID which is associated with the session ID 501 in the request recording DB 411.

Reference numeral 702 denotes a response estimated time which is an estimated time at which a response corresponding to the request ID 700 is returned to the client terminal 102 (Y) as an error response.

Figure 8:
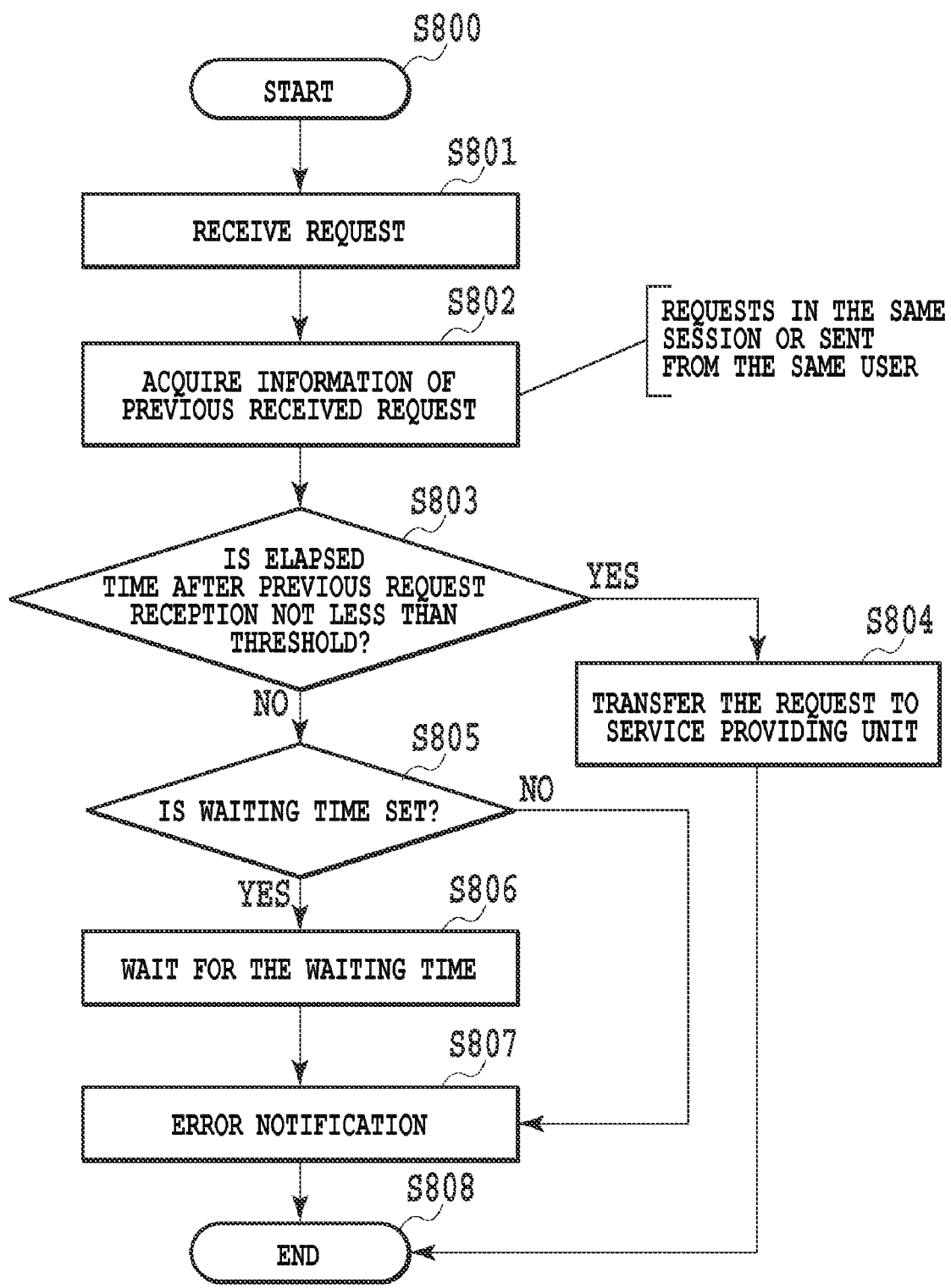
FIG. 8 is a diagram showing a flow chart of a processing example performed by the server 101 (X) in the embodiment of the present invention.

FIG. 8 is a diagram showing a flow chart of a processing example performed by the server 101 (X) in the present embodiment. An overall processing flow by the server 101 (X) will be described using FIG. 8. Overall processing by the server 101 (X) is performed at steps S800 to S808 shown below. It is assumed in the present embodiment that the request interval threshold is set at 10 sec. and the error response waiting time is set at 12 sec.

The processing starts at step S800.

At S801, a request receiving processing is performed as follows:

The request receiving unit 400 receives a request from the client terminal 102 (Y). Then, the request monitoring unit 410 issues a request ID to the received request. If no session ID is present in the received request as information, the request monitoring unit 410 also issues a session ID. The issued session ID is made to be set to a request to be sent by the client terminal 102 (X) next time by using technology such as Cookie in HTTP communication.

Next, the request monitoring unit 410 stores the request ID, session ID, and receiving time (current time) at which the request was received in the request ID 500, the session ID 501, and the receiving time 502 of the request recording DB 411 respectively. Then, the request monitoring unit 410 delivers the request to the request processing determination unit 412.

At S802, a request acquisition processing of information corresponding to the previous received request is performed as follows:

The request processing determination unit 412 acquires receiving times at which the latest two requests (the current received one and previous received one) among requests having the same session ID as that of the received request from the request recording DB 411. That is, the request processing determination unit 412 acquires the previous request receiving time and current request receiving time in the same session.

At step S803, a request processing is determined as follows:

The request processing determination unit 412 acquires the request interval threshold (10 sec.) which is a criterion for determining whether or not to execute the demanded service for the request received from the request monitoring setting value management DB 413.

It is determined whether or not a receiving time difference between the current received request and the previous received request, acquired at step S802, exceeds the request interval threshold (10 sec.).

If the receiving time difference between the current received request and the previous received request exceeds the request interval threshold (10 sec.), processing proceeds to S804.

If the receiving time difference between the current received request and the previous received request does not exceed the request interval threshold (10 sec.), processing proceeds to S805.

That is, it is determined whether or not to reject the request received at step S801 on the basis of whether or not the receiving time difference exceeds the request interval threshold (10 sec.) which is a preset threshold.

The request interval threshold is adopted in the present embodiment as the criterion, but as described above, the number of requests sent in a period of time or the like may be adopted as the criterion. That is, whether or not to reject the request received at step S801 is determined on the basis of whether or not the number of requests received in a certain period of time in the same session exceeds the upper limit of the number of requests in the period of time, which is a preset threshold. That is, if the upper limit of the number of requests in the period of time is exceeded, processing proceeds to step S805.

At S804, a service providing processing is performed as follows:

The service providing unit 401 performs processing for the service demanded by the request received at step S801 and returns a processing result to the client terminal 102 (Y) as a response.

At S805, an error response waiting time is determined as follows:

The request processing determination unit 412 determines whether or not the error response waiting time is set larger than zero. For example, the error response waiting time to decide the time before transmission of an error response is acquired from the request monitoring setting value management DB 413.

If the error response waiting time is 0 sec., processing proceeds to S807. If the error response waiting time is larger than 0 sec., processing shown below is performed. The time obtained by adding the error response waiting time to the current time is set as a response estimated time 702 and the response estimated time 702 is stored in the error response transmission waiting DB 414 together with the request ID 700 and session ID before proceeding to S806.

Since the error response waiting time is 12 sec. in the present embodiment, the response estimated time 702 is obtained by adding 12 sec. to the current time.

At S806, a response transmission waiting processing is performed as follows:

The error response transmission unit 415 refers to the error response transmission waiting DB 414 to acquire the response estimated time 702 whose request ID 700 and session ID 701 are the same as those of the request received at step S801.

The error response transmission unit 415 waits until the response estimated time 702. Then, processing proceeds to S807.

At S807, an error response transmission processing is performed as follows:

The error response transmission unit 415 sends the error response which has reached the response estimated time to the client terminal 102 (Y).

The processing ends at step S808.

Figure 9:
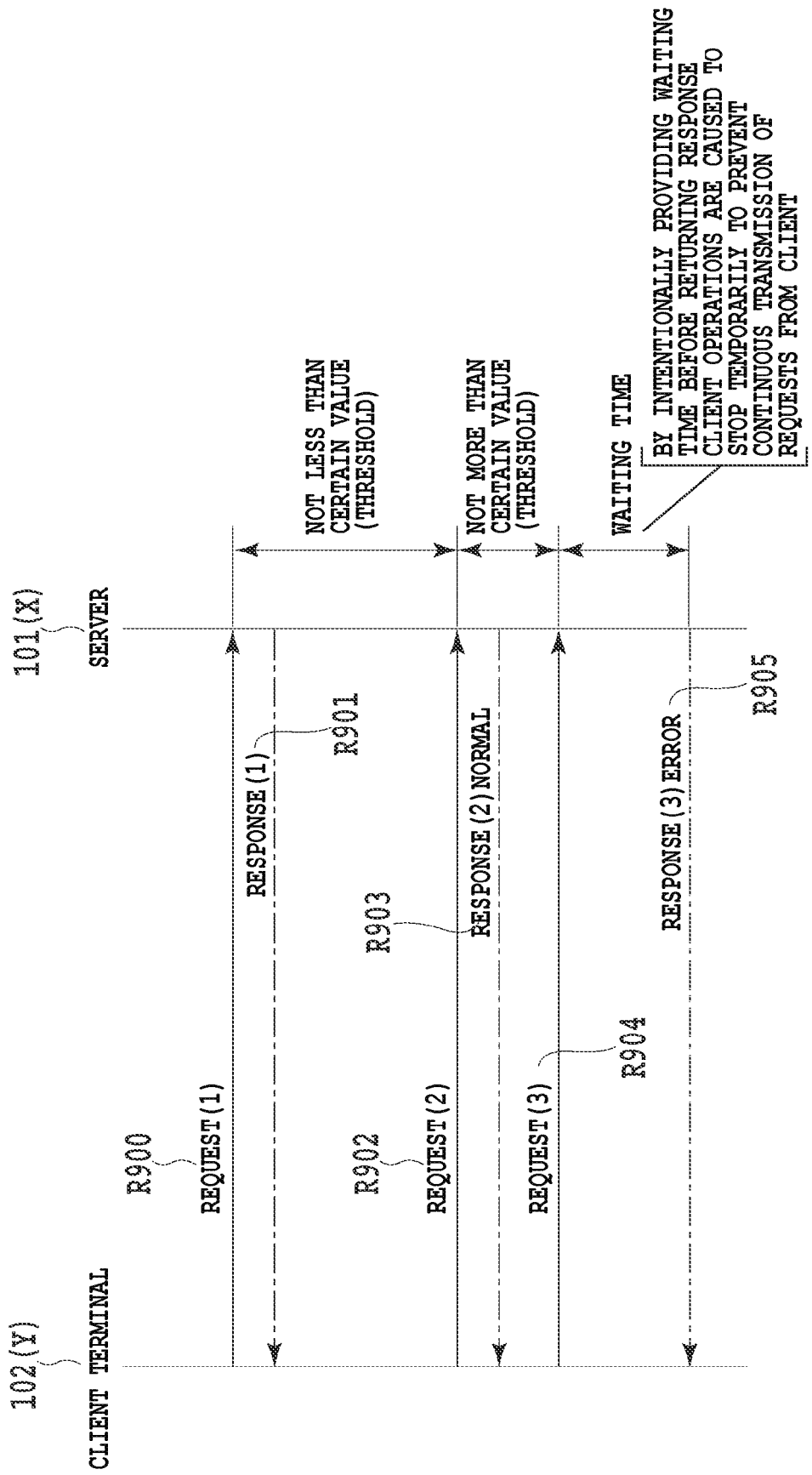
FIG. 9 is a diagram showing a processing sequence example between the server 101 (X) and the client terminal 102 (Y) in the embodiment of the present invention.

FIG. 9 is a diagram showing a processing sequence example between the server 101 (X) and the client terminal 102 (Y) in the present embodiment. A sequence of requests and responses between the server 101 (X) and the client terminal 102 (Y) when the server 101 (X) performs processing described in FIG. 8 will be described using FIG. 9.

First, a request R900 for a service is sent from the client terminal 102 (Y) to the server 101 (X). It is assumed that the request R900 is the first request sent from the client terminal 102 (Y). After receiving the request R900, the server 101 (X) issues a session ID to start a session. The server 101 (X) performs processing for the request R900 and returns a response R901 by embedding the session ID in the response R901.

Next, the client terminal 102 (Y) sends a request R902 following the request R900 to the server 101 (X). Before sending the request R902, the client terminal 102 (Y) embeds the session ID embedded in the response R901 in the request R902 unchanged. Timing to transmit the request R902 from the client terminal 102 (Y) to the server 101 (X) depends on a user operation or client application.

The server 101 (X) that received the request R902 calculates a time interval between the time when the request R900 was received and the time when the request R902 was received. If the calculation result exceeds the request interval threshold acquired from the request monitoring setting value management DB 413, the server 101 (X) performs processing for the request R902 and returns a response R903.

Here, it is assumed that the client terminal 102 (Y) has sent a request R904 for a service at time intervals not exceeding the request interval threshold. At this point, the server 101 (X) that received the request R904 calculates a time interval between the time when the request R902 was received and the time when the request R904 was received. Since the calculation result does not exceed the request interval threshold acquired from the request monitoring setting value management DB 413, the server 101 (X) returns an error response R905 as a processing result to the request R904. When returning the error response R905, the server 101 (X) does not return the error report immediately and waits until the error response transmission waiting time elapses before returning the error response.

Systems providing services via a network such as the Internet use HTTP (HyperText Transfer Protocol) for communication between the server 101 (X) and the client terminal 102 (Y) in many cases. In such cases, after sending a request, the client terminal 102 (Y) is in most cases in a processing waiting state until a response is returned from the server 101 (X). Therefore, timing to perform retry processing of the client terminal 102 (Y) can be controlled to some extent by changing transmission timing of an error response by the error response transmission waiting time. As a result, transmission of continuous requests from the client terminal 102 (Y) can also be reduced.

That is, if the time interval between the requests R900 and R902 from the client terminal 102 (Y) to the server 101 (X) is not less than the request interval threshold, there is almost no overload on the server 101 (X). Thus, in this case, after processing the request from the client terminal 102 (Y) the server 101 (X) can send the response R903 as a processing result. If, on the other hand, the above time is less than the request interval threshold, like between the requests R902 and R904, a situation in which a request of the next processing comes before processing being performed is completed or only requests of a specific client are processed may arise. Thus, performance of the server 101 (X) may be degraded, leading to an overloaded state of the server 101 (X). There is also a possibility that only requests of a specific client are processed and requests of other clients are hardly processed.

In contrast, in the present embodiment, if the above time is less than the request interval threshold (determined to be an error), in which case there is a possibility that the server 101 (X) is overloaded, the server 101 (X) sends the error response R905 after a fixed time has elapsed. Further, the server 101 (X) sends an error response after a fixed time has elapsed because if an error response is sent immediately, the request may be resent immediately from the client. Therefore, since there is no transmission of response from the server 101 (X) to the client terminal 102 (Y) during the fixed time, transmission of requests from the client terminal 102 (Y) to the server 101 (X) can temporarily be stopped. Consequently, continuous transmission of requests that could cause the server 101 (X) to be thrown into an overloaded state can be controlled.

Figure 10:
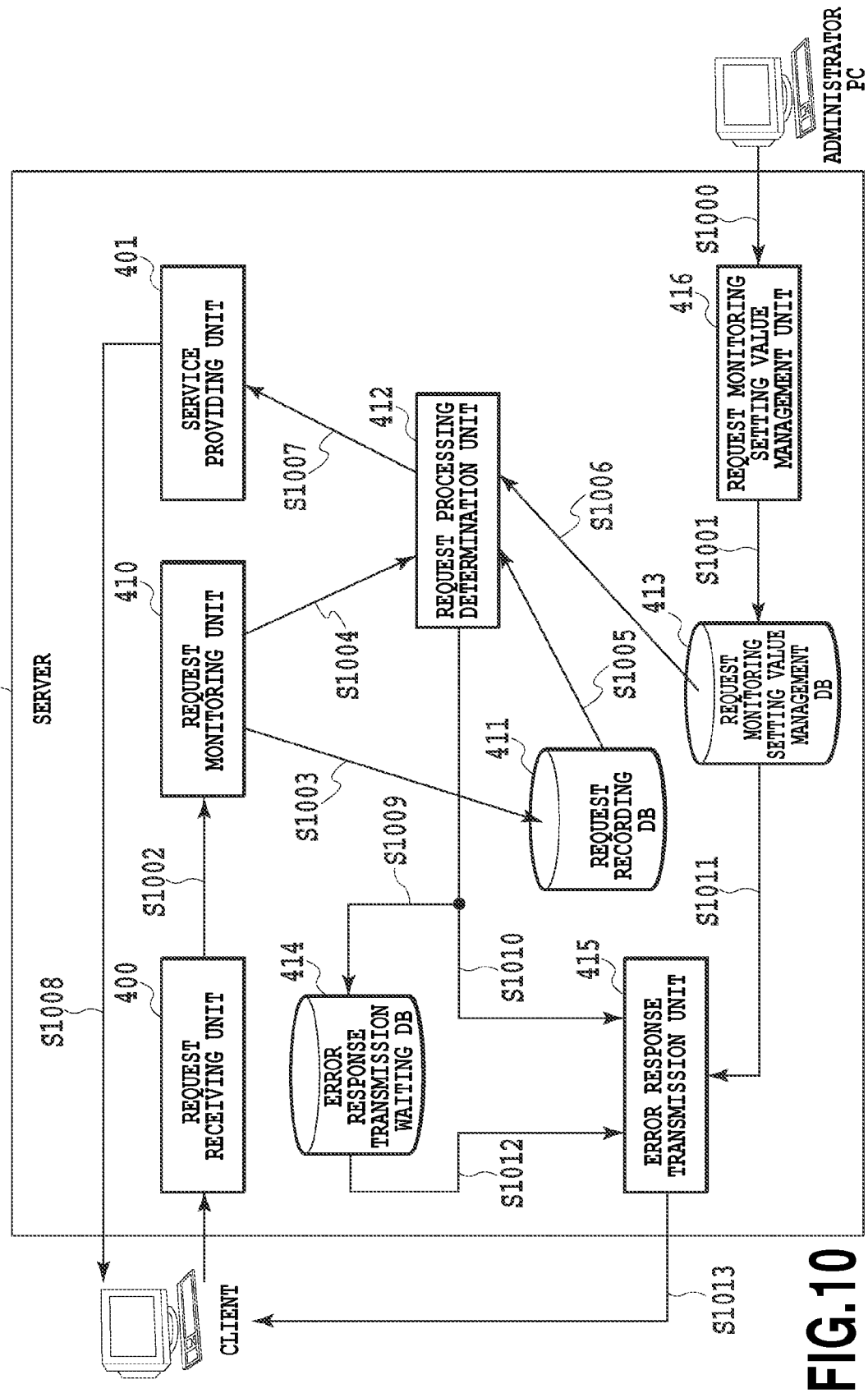
FIG. 10 is a diagram illustrating processing examples performed by each function in processing performed by the server 101 (X) in the embodiment of the present invention.

FIG. 10 is a diagram illustrating processing examples performed by each function in processing executed in the server 101 (X) in the present embodiment.

It is assumed that the system administrator has entered setting items of the request monitoring setting value management DB 413. Here, setting items are the request interval threshold and the error response transmission waiting time. Instead of the request interval threshold, "a request count period to count the number of requests in a certain time period, an upper limit of the number of requests in the time period" may be used.

Processing by the system administrator until setting items are entered in the request monitoring setting value management DB 413 is as shown below.

(Step 1) A request for setting is sent to the request monitoring setting value management unit 416 by operating a client terminal for administrator.

Here, the client terminal for administrator may be connected to the network in the same system as the server 101 (X) or, like the client terminal 102 (Y), to a network outside the system.

(Step 2) After receiving the setting request, the request monitoring setting value management unit 416 sets the value of the setting item contained in the request for setting to the request monitoring setting value management DB 413 (S1001).

Next, processing performed by each function of the server 101 (X) after a request is sent by the client terminal 102 (Y) until a response is received will be described.

In the first step of the processing, a request is sent to the server 101 (X) by the client terminal 102 (Y)). The request receiving unit 400 in the server (X) receives the request and delivers the received request to the request monitoring unit 410 (S1002).

The request monitoring unit 410 issues a request ID to the received request and acquires the session ID contained in the request. If no session ID is contained in the request, the request monitoring unit 410 issues a session ID. Next, the request monitoring unit 410 stores the issued request ID, the acquired or issued session ID, and the time (receiving time) at which the request was received in the request recording DB 411 (S1003).

That is, the request monitoring unit 410 acquires the receiving time, which is information related to the received request and is used to determine whether or not to reject the received request, based on the request received by the request receiving unit 400. In the present embodiment, the receiving time is stored manageably in the request recording DB 411 being associated with each request, and thus the request monitoring unit 410 and the request processing determination unit 412 monitor receiving intervals of requests.

Then, the request monitoring unit 410 delivers the received request to the request processing determination unit 412 (S1004).

The request processing determination unit 412 acquires two latest requests having the same session ID as that of the request from the request recording DB 411 (S1005). That is, the request received previously and the request to be processed currently with the same session ID is acquired.

Next, the request processing determination unit 412 acquires the request interval threshold (10 sec.) and the error response transmission waiting time (12 sec.) from the request monitoring setting value management DB 413 (S1006). Next, the request processing determination unit 412 calculates a difference between the receiving times of the two acquired requests. Next, the request processing determination unit 412 compares the difference between the receiving times of the two requests and the request interval threshold (10 sec.) to determine whether or not to perform processing for the request (whether or not to reject the received request).

If the difference between the receiving times of the two requests exceeds the request interval threshold (10 sec.), the request processing determination unit 412 delivers the request to the service providing unit 401 (S1007). That is, in this case, the server 101 (X) determines that the time between receiving the previous request and receiving the current request in the same session may not cause the server 101 (X) to be thrown into an overloaded state, and thus performs processing based on the received request.

If the difference between the receiving times of the two requests does not exceed the request interval threshold, the request processing determination unit 412 calculates an error response transmission estimated time (response estimated time) by adding the error response transmission waiting time (12 sec.) to the current time. That is, if the difference is less than the request interval threshold, this means that the next request is received when the server 101 (X) could be thrown into an overloaded state in the same session. Thus, transmission of the next request from the client terminal 102 (Y) can be delayed by setting the error response transmission estimated time to delay transmission by the error response transmission waiting time so that loads on the server 101 (X) can be reduced.

Here, when calculating an error response transmission estimated time, the request processing determination unit 412 may refer to processing conditions of the server 101 (X) and calculate the error response transmission estimated time in accordance with processing conditions. For example, the request processing determination unit 412 may refer to the CPU usage rate (unit: %) of the server 101 (X), and dynamically calculate the error response transmission estimated time in accordance with the CPU usage rate (unit: %) such as the formula shown below.

Error response transmission estimated time=current time+error response waiting time×(100+CPU usage rate)/100     [Formula 1]

According to the above formula, when the CPU usage rate is 80%, the time obtained by adding 12 (sec.)×1.8=21.6 (sec.) to the current time will be the error response transmission estimated time. Thus, the error response transmission estimated time may be calculated in accordance with conditions, instead of using a fixed value.

The request processing determination unit 412 stores the request ID 700, the session ID 701, and the response estimated time 702 in the error response transmission waiting DB 414 (S1009) and delivers the request to the error response transmission unit 415 (S1010).

Here, if instead of the request interval threshold, the request count time period and the upper limit of the number of requests in the time period are set to the request monitoring setting value management DB 413, the request processing determination unit 412 makes a processing determination as shown below.

The request processing determination unit 412 acquires requests sent during the request count time period from the request recording DB 411 to calculate the number of requests. If the calculated number of requests does not reach the upper limit of the number of requests in the time period, the request processing determination unit 412 delivers the request to the service providing unit 401. If, on the other hand, the calculated number of requests exceeds the upper limit of the number of requests in the time period, the request processing determination unit 412 delivers the request to the error response transmission unit 415.

The service providing unit 401 performs processing in accordance with a demand contained in the request and returns a processing result to the client terminal 102 (Y) (S1008).

The error response transmission unit 415 refers to the error response transmission waiting DB 414 to acquire the response estimated time 702 from the request ID 700 and the session ID 701 regarding the request. The error response transmission unit 415 waits until the response estimated time 702 and when the response estimated time 702 comes, returns an error response to the client terminal 102 (Y) (S1013).

According to the present embodiment, as described above, the server 101 (X) can monitor receiving intervals of requests for each session on and determine whether or not to perform actual processing. Accordingly, the number of processing can be reduced for requests sent continuously so that processing loads on the server 101 (X) can be reduced. In addition, according to the present embodiment, timing to return a response to a request for which processing is determined not to be performed can be controlled. Accordingly, while a client waits for a response, requests being continuously sent from the client can be reduced.

In the present embodiment, the unit of monitoring receiving intervals of requests on the server 101 (X) is the session, but receiving intervals of requests may be monitored in units of users who sent requests by using requests after user authentication. In such a case, the item managed as the session ID will be managed as the user ID. That is, the above processing according to the present embodiment will be performed for the same user ID.

Second Embodiment

In the first embodiment, a mode in which an error response is returned to all requests for which a difference between the receiving time of the previously received request by the server 101 (X) and that of the currently received request does not exceed a threshold is described.

Normally, the client terminal 102 (Y) does not send the next request to the server 101 (X) before a response to the previous request from the server 101 (X) is received. However, the client terminal 102 (Y) does not necessarily send the next request after receiving a response.

For example, when a Web service or the like is used, any developer can develop a client application. The operation of the client terminal 102 (Y) to send the next request after receiving a response is partially dependent on the makeup of the client application. Thus, depending on the makeup of the client application, a request may be sent from the client terminal 102 (Y) during error response transmission wait.

Also from the viewpoint of reducing processing loads on the server 101 (X), if a request is received from the same client during error response transmission wait, discarding the request can be considered to be effective.

Figure 11:
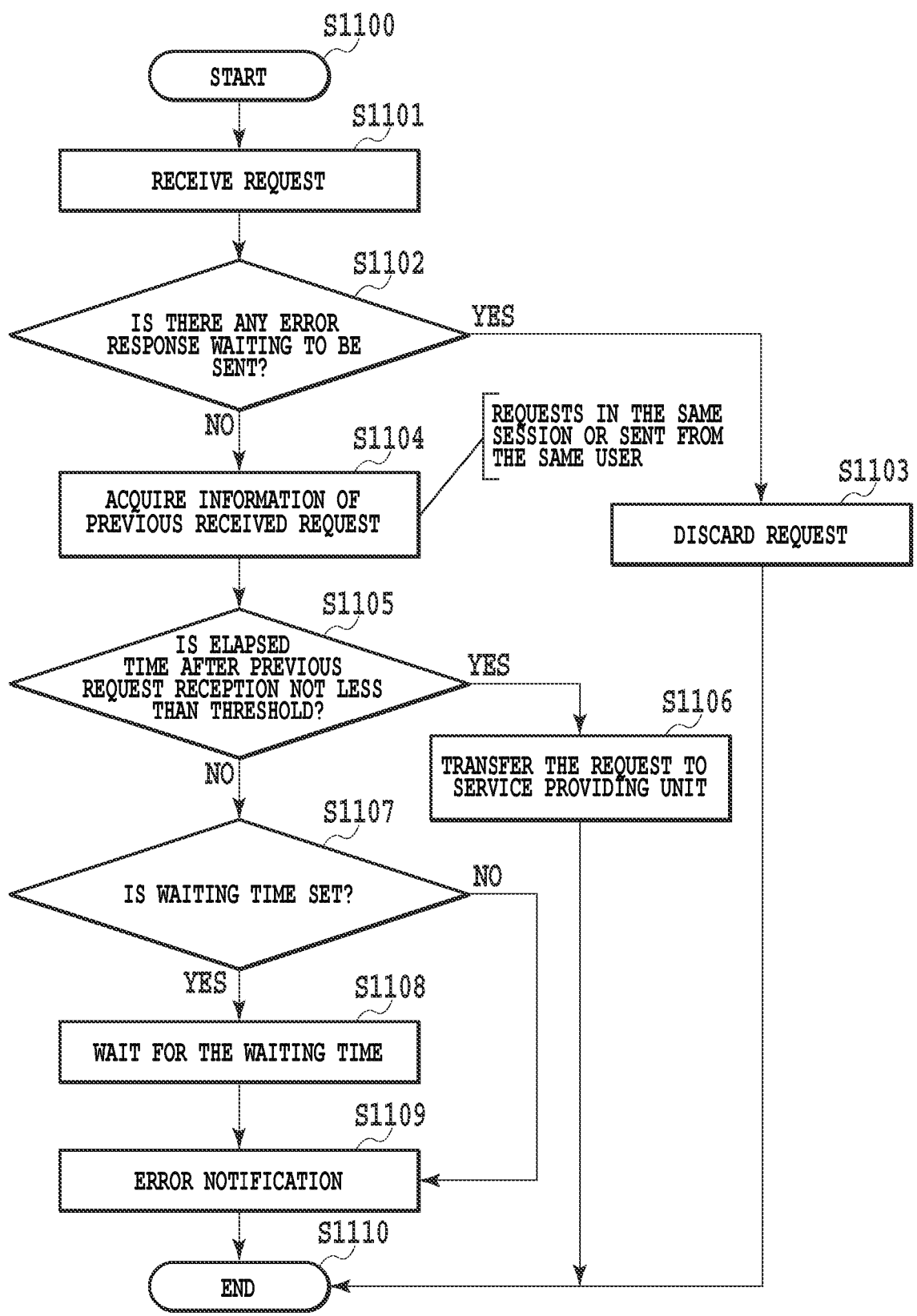
FIG. 11 is a diagram showing a flow chart of a processing example performed by the server 101 (X) in the embodiment of the present invention.

FIG. 11 is a diagram showing a flow chart of a processing example performed by the server 101 (X) in the present embodiment. An overall processing flow by the server 101 (X) will be described using FIG. 11. Overall processing by the server 101 (X) is performed at steps S1100 to S1110 shown below. It is assumed in the present embodiment that the request interval threshold is set at 10 sec. and the error response waiting time at 12 sec.

The processing starts at step S1100.

At S1101, a request receiving processing is performed as follows:

A request is received from the client terminal 102 (Y). A request ID is issued to the received request. If no session ID is present in the request as information, a session ID is also issued.

Next, the request ID, session ID, and receiving time (current time) at which the request was received are stored at the request ID 700, the session ID 701, and the receiving time 702 in the request recording DB 411 respectively.

At step S1102, whether there is any error response waiting to be sent is determined as follows:

S1102 refers to the error response transmission waiting DB 414 and checks whether or not there exists any record whose session ID 701 has the same session ID as that of the current request received at step S1101.

If such a record exists, processing proceeds to S1103. If such a record does not exist, processing proceeds to S1104.

Here, before determining whether or not to reject the received request, as described later, S1102 determines whether or not there exists any request, among requests sent from the same client terminal 102 (Y) as the request currently received, waiting for transmission of an error response. That is, S1102 refers to the error response transmission waiting DB 414 and checks whether or not there exists any request, among requests sent from the client terminal 102 (Y) that sent the received request, waiting for transmission of an error response. If such a request exists based on the checking, processing proceeds to processing (S1103) to discard the currently received request.

At S1103, the currently received request at step S1101 is discarded.

At S1104, an acquisition processing of information corresponding to the previously received request is performed as follows:

Receiving times at which the latest two requests (the currently received request and the previously received request) among requests having the same session ID as that of the received request are acquired from the request recording DB 411.

At step S1105, request processing is determined as follows:

The request interval threshold (10 sec.), which is a criterion for determining whether or not to execute the demanded service for the received request, is acquired from the request monitoring setting value management DB 413.

It is checked whether or not a difference of the receiving time between the previously received request and the currently received request acquired at step S1104 exceeds the request interval threshold (10 sec.).

If the difference of the receiving time between the previously received request and the currently received request exceeds the request interval threshold (10 sec.), processing proceeds to S1106.

If the difference of the receiving time between the previously received request and the currently received request does not exceed the request interval threshold (10 sec.) processing proceeds to S1107.

Although the request interval threshold is adopted in the present embodiment as the criterion, for example, the number of requests in a time period described above may be adopted.

At S1106, a service providing processing is performed as follows:

Processing for the service demanded by the received request is performed and a processing result is returned to the client terminal 102 (Y) as a response.

At step S1107, the response waiting time is determined as follows:

The error response waiting time (12 sec.) to decide the time before transmission of an error response is acquired from the request monitoring setting value management DB 413.

If the error response waiting time is 0 sec., processing proceeds to S1109. If the error response waiting time is greater than 0 sec., processing shown below is performed. The time obtained by adding the error response waiting time (12 sec.) to the current time is set as the response estimated time 702 and the response estimated time 702 is stored in the error response transmission waiting DB 414 together with the request ID 700 and the session ID 701 before proceeding to S1108.

At S1108, a response transmission wait processing is performed as follows:

S1108 refers to the error response transmission waiting DB 414 and acquires the response estimated time 702 whose request ID 700 and session ID 701 are the same as those of the received request.

Next, after being on standby until the acquired response estimated time 702 comes, processing proceeds to S1109.

At S1109, an error response transmission processing is performed as follows:

An error response is sent to the client terminal 102 (Y). The processing ends at step S1110.

Figure 12:
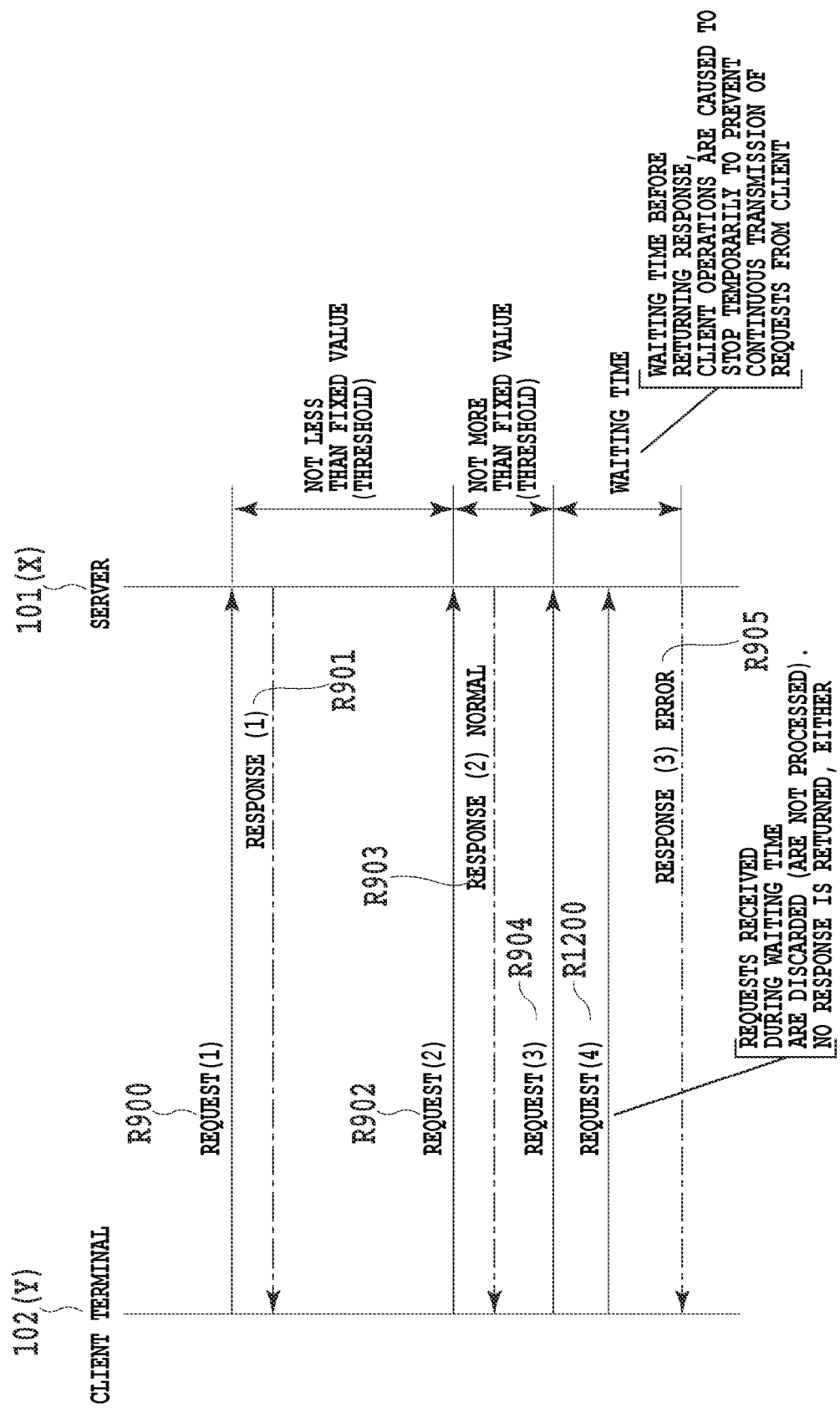
FIG. 12 is a diagram showing a processing sequence example between the server 101 (X) and the client terminal 102 (Y) in the embodiment of the present invention.
Figure 13:
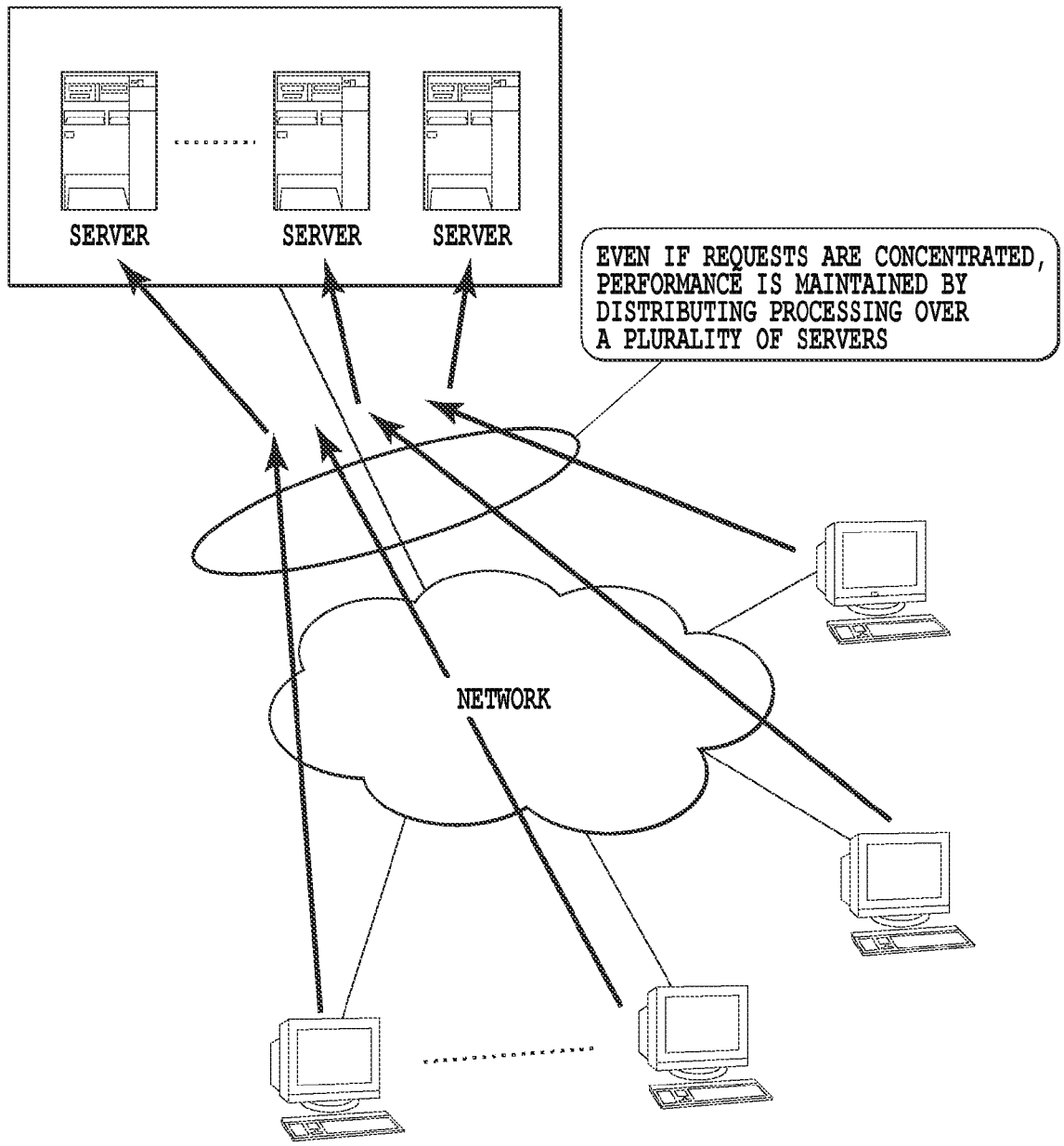
FIG. 13 is a diagram illustrating load sharing when requests are concentrated between conventional servers and terminals (clients)
Figure 14:
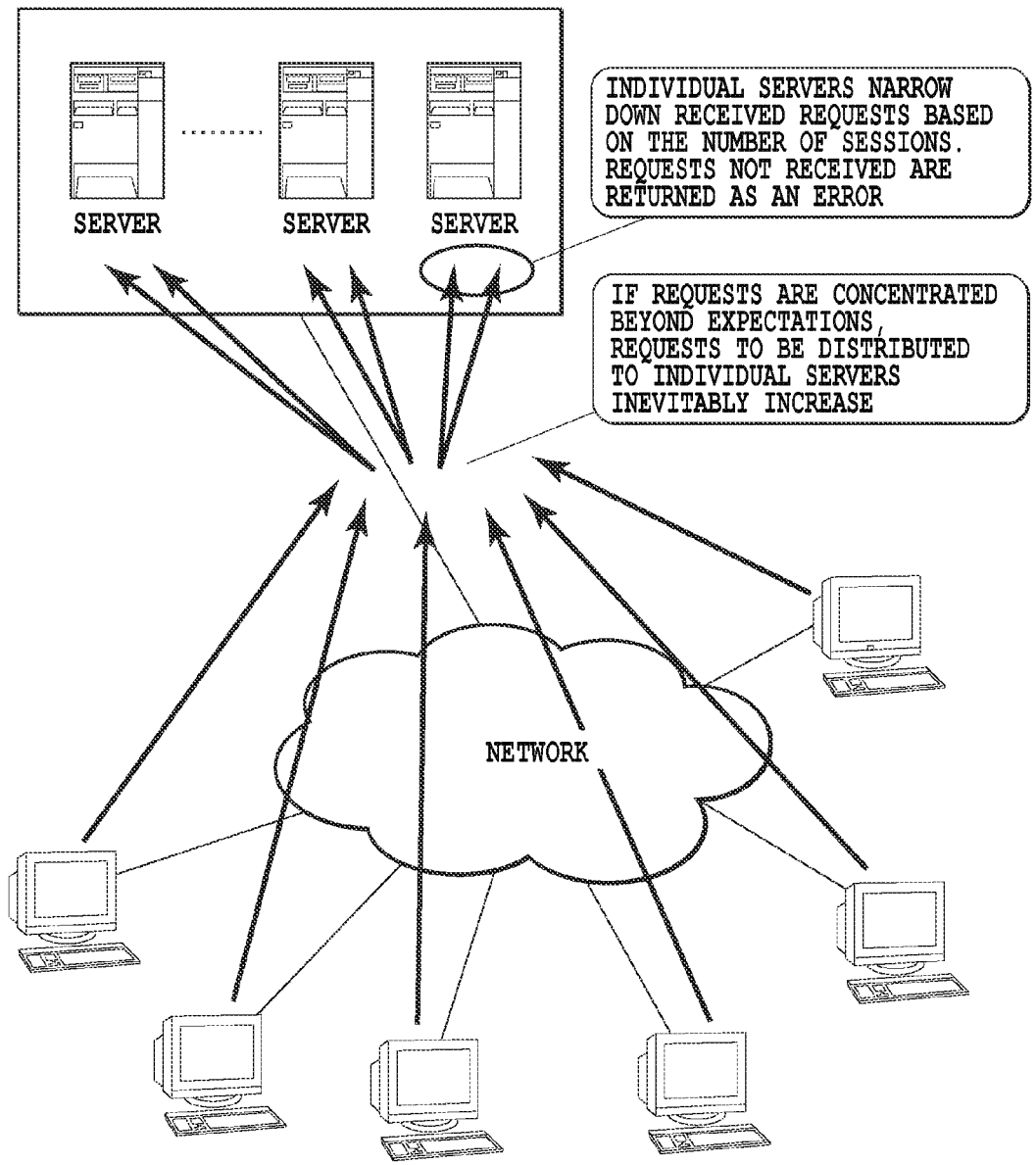
FIG. 14 is a diagram illustrating narrowing-down of requests through the number of sessions when requests are concentrated between conventional servers and terminals (clients)
Figure 15:
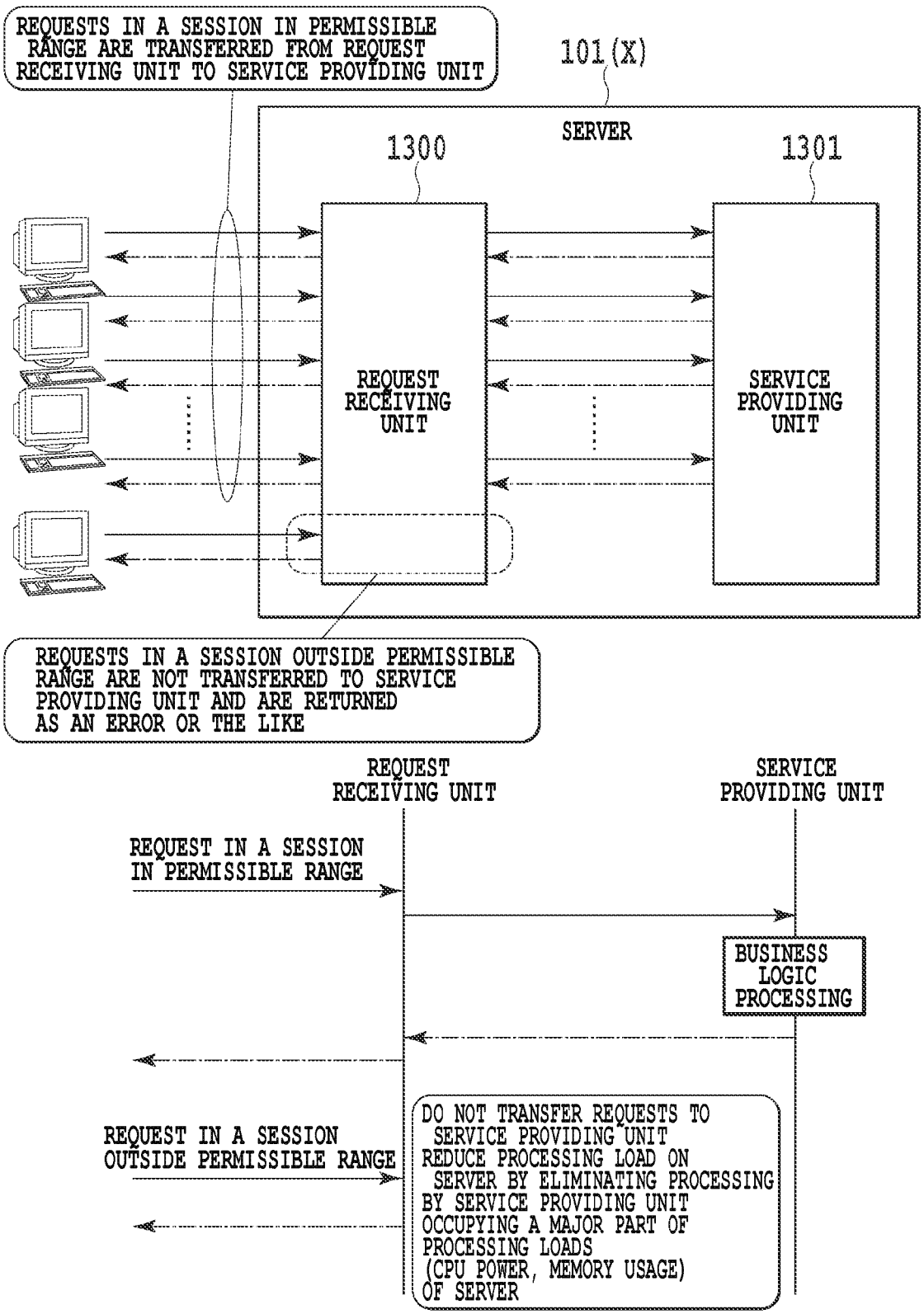
FIG. 15 is a sequence diagram illustrating processing (narrowing-down of requests through the number of sessions) on the server when requests are concentrated between conventional servers and terminals (clients)
Figure 16:
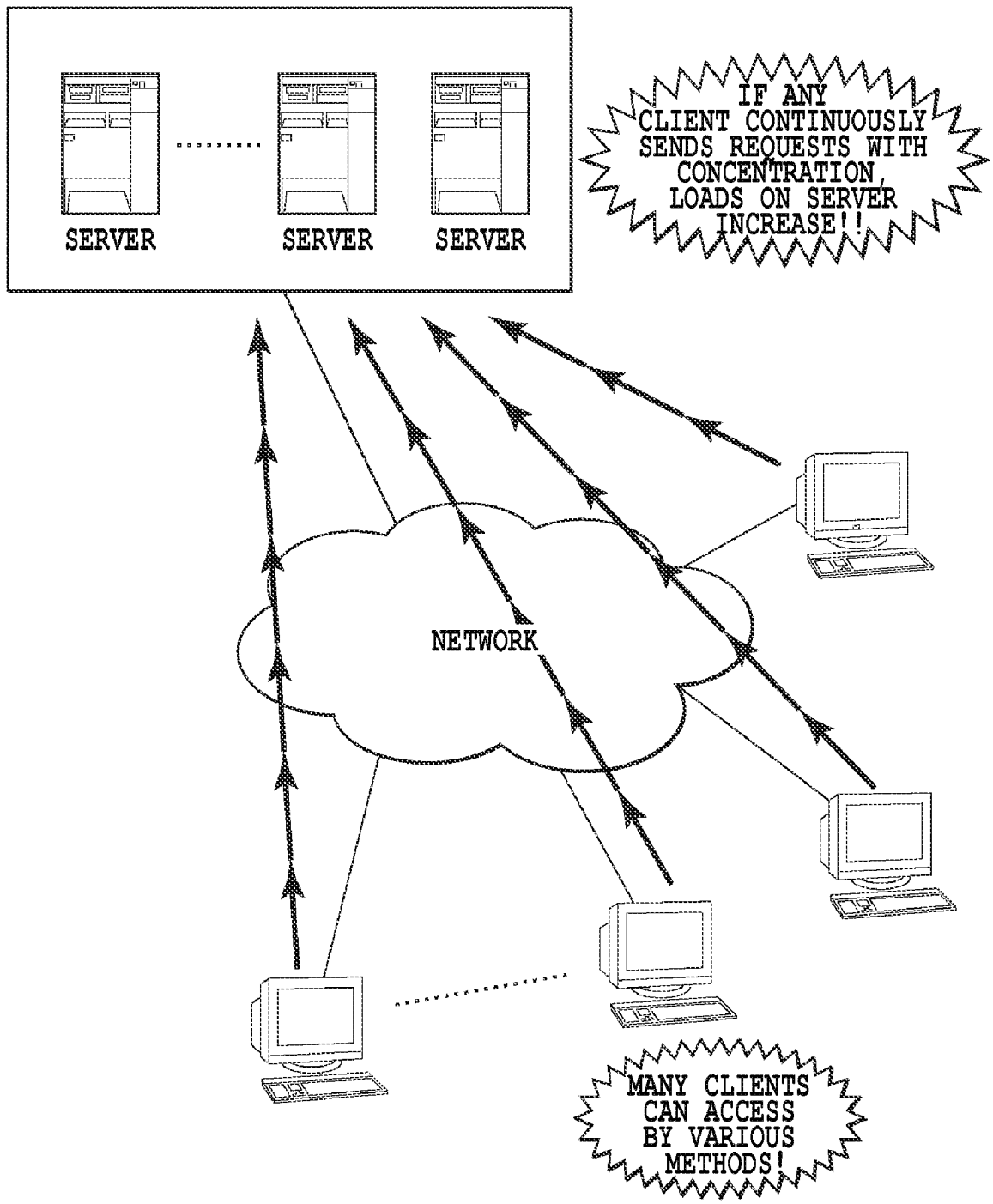
FIG. 16 is a diagram illustrating a situation when some client sends requests intensively between conventional servers and terminals (clients)
Figure 17:
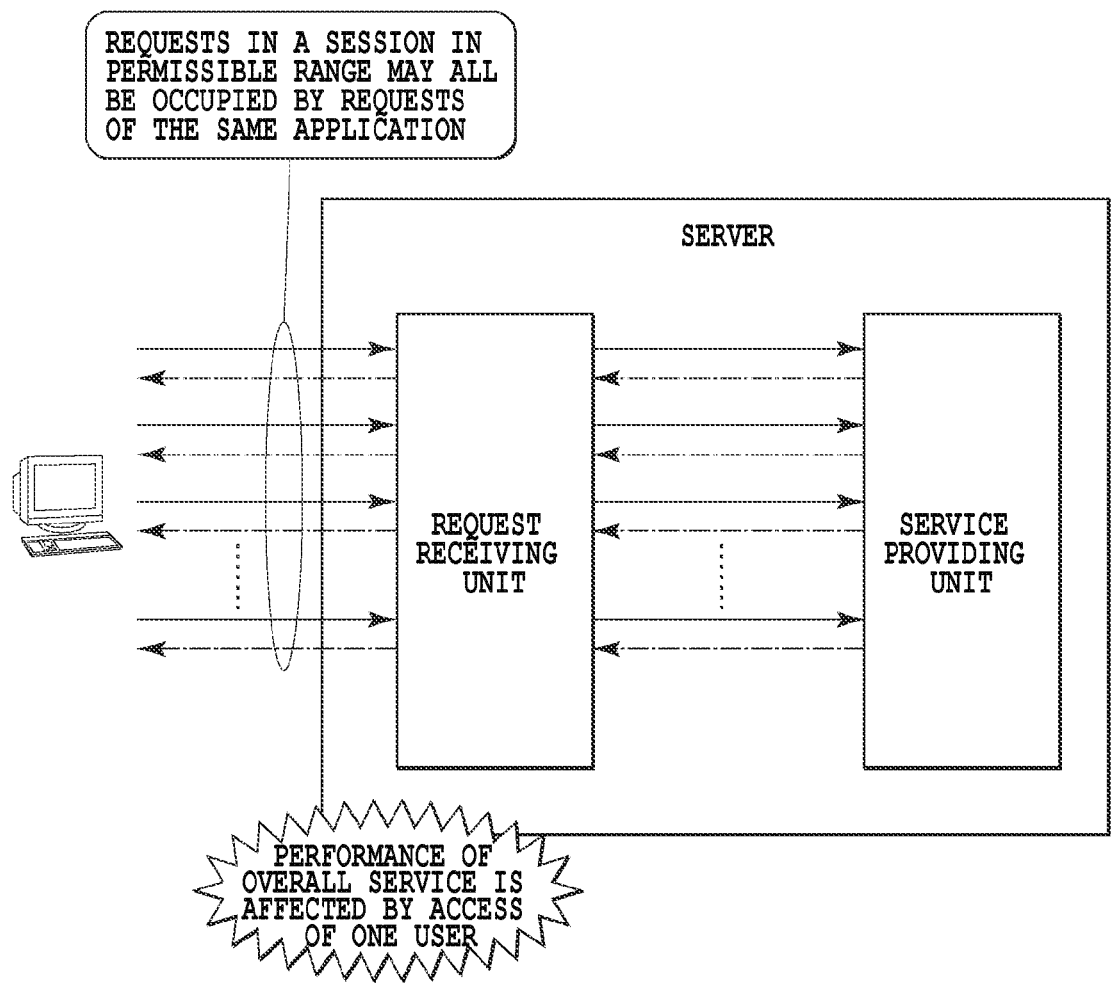
FIG. 17 is a diagram illustrating processing conditions when some client sends requests intensively between conventional servers and terminals (clients).

FIG. 12 is a diagram showing a processing sequence example between the server 101 (X) and the client terminal 102 (Y) in the present embodiment. A sequence of requests and responses between the server 101 (X) and the client terminal 102 (Y) when the server 101 (X) performs processing described in FIG. 11 will be described using FIG. 12.

Requests R900, R902, and R904 and responses R901, R903, and R905 in FIG. 12 are similar to requests and responses in the first embodiment described using FIG. 9.

Here, a case in which a request R1200 is sent from the client terminal 102 (Y) to the server 101 (X) in a transmission waiting state of the error response R905 to the request R904 is considered.

After the request R1200 has been received, the server 101 (X) discards the request R1200.

Processing performed by each function in processing performed by the server 101 (X) in the present embodiment is basically the same as that in the first embodiment. Differences from the first embodiment lie in processing by the request processing determination unit 412 and that by the error response transmission unit 415.

While the request processing determination unit 412 performs comparison processing between the previously received request and the currently received request in the first embodiment, the request processing determination unit 412 in the present embodiment performs processing shown below before the above processing.

The request processing determination unit 412 refers to the error response transmission waiting DB 414 to check whether there exists any record whose session ID 701 is the same session ID as that of the request. If such a record exists, the request is discarded so that the request will not be processed. If such a record does not exist, like the first embodiment, the request processing determination unit 412 performs comparison processing between the previously received request and the currently received request to further perform processing.

Also in the first embodiment, after sending an error response, the error response transmission unit 415 does not explicitly delete records present in the error response transmission waiting DB 414. The error response transmission unit 415 in the present embodiment explicitly deletes, after sending an error response, records whose request ID and session ID match those of records present in the error response transmission waiting DB 414.

According to the present embodiment, as described above, even if a request is received from the same client terminal 102 (Y) in an error response transmission waiting state in the first embodiment, the request can be discarded. Accordingly, the possibility of the server 101 (X) being occupied by requests from the same client terminal 102 (Y) can be reduced.

Other Embodiments

The present invention can be applied to systems constituted by a plurality of devices (such as a computer, interface device, reader, and printer) and also to equipment (such as a multifunctional device, printer, and facsimile machine) constituted by one device.

A processing method for causing a storage medium to store a program to operate one element of the above embodiments so as to achieve functions of the above embodiments and reading the program stored in the storage medium as code to execute the program on a computer is also included in the scope of the above embodiments. That is, a computer readable storage medium is also included in the category of the embodiments. Moreover, in addition to the storage medium in which the above computer program is stored, the computer program itself is also included in the above embodiments.

As the storage medium, for example, a floppy (registered trademark) disk, hard disk, optical disk, magneto-optical disk, CD-ROM, magnetic tape, non-volatile memory card, and ROM can be used.

The above computer program stored in a storage medium is not limited to a standalone program performing processing and other programs operating on the OS to execute functions of the above embodiments in collaboration with other software and functions of an extended board are also included in the category of the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-320142, filed Dec. 11, 2007, which is hereby incorporated by reference herein in its entirety.

What is claimed is:

1. An information processing device, comprising at least one processor, wherein said at least one processor functions as:

a request receiving unit configured to receive a request from a client;

a request monitoring unit configured to store information related to the request received by the request receiving unit in a request recording database, the information being used for determining whether or not to reject the received request;

a request monitoring setting value management database configured to manage a reference value for determining to reject the received request;

a request processing determination unit configured to determine whether or not to reject the request received by the request receiving unit with reference to the reference value managed by the request monitoring setting value management database and the information stored in the request recording database; and an error response transmission unit configured to return an error response, when the request processing determination unit determines to reject the received request, to the client that transmitted the request after a certain time has passed from the determination of rejection, wherein the certain time is different from the reference value.

2. The information processing device according to claim 1, further comprising an error response transmission waiting database configured to manage information about the error response, wherein the error response transmission unit returns the error response after the certain time has passed based on information about the error response managed by the error response transmission waiting database.

3. The information processing device according to claim 2, wherein the request processing determination unit refers to the error response transmission waiting database before determining whether or not to reject the received request and when determining that an error response corresponding to a request transmitted previously from the client that transmitted the request is managed by the error response transmission waiting database, the request processing determination unit discards the received request.

4. The information processing device according to claim 1, wherein the request processing determination unit determines whether or not to reject the received request based on whether or not a difference between a previous request receiving time and a current request receiving time in an identical session exceeds the reference value managed by the request monitoring setting value management database.

5. The information processing device according to claim 1, wherein the request processing determination unit determines whether or not to reject the received request based on whether or not the number of requests received in a certain period in an identical session exceeds the reference value managed by the request monitoring setting value management database.

6. The information processing device according to claim 1, wherein the request processing determination unit determines whether or not to reject the received request based on whether or not a difference between a previous request receiving time and a current request receiving time among requests transmitted by an identical user ID exceeds the reference value managed by the request monitoring setting value management database.

7. The information processing device according to claim 1, wherein the request processing determination unit determines whether or not to reject the received request based on whether or not the number of requests received in a certain period among requests transmitted by an identical user ID exceeds the reference value managed by the request monitoring setting value management database.

8. The information processing device according to claim 1, wherein said at least one processor also functions as a request monitoring setting value management unit configured to perform predetermined processing on a setting value managed by the request monitoring setting value management database.

9. The information processing device according to claim 1, wherein said at least one processor also functions as a service providing unit configured to perform processing corresponding to the received request when the request processing determination unit determines not to reject the request.

10. An information processing method, comprising:
a request receiving step of receiving a request from a client;
a request monitoring step of storing information related to the request received at the request receiving step in a request recording database, the information being used for determining whether or not to reject the received request;
a request processing determination step of determining whether or not to reject the request received at the request receiving step with reference to a reference value managed by a request monitoring setting value management database and the information stored in the request recording database; and
an error response transmission step of returning an error response, when the request processing determination step determined not to reject the received request, to the client that transmitted the request after a certain time has passed from the determination of rejection, wherein the certain time is different from the reference value.

11. A non-transitory computer-readable storage medium storing, in computer-executable form, a program which causes a computer to perform a method, the method comprising:
a request receiving step of receiving a request from a client;
a request monitoring step of storing information related to the request received at the request receiving step in a request recording database, the information being used for determining whether or not to reject the received request;
a request processing determination step of determining whether or not to reject the request received at the request receiving step with reference to the reference value managed by a request monitoring setting value management database and the information stored in the request recording database; and
an error response transmission step of returning an error response, when the request processing determination step determines to reject the received request, to the client that transmitted the request after a certain time has passed from the determination of rejection, wherein the certain time is different from the reference value.

* * * * *